(12) United States Patent
Wilhelmsson et al.

(10) Patent No.: US 10,038,578 B2
(45) Date of Patent: Jul. 31, 2018

(54) MULTI-MODULATION TRANSMITTER, RECEIVER AND METHODS FOR HANDLING MULTI-MODULATION IN WIRELESS COMMUNICATION SYSTEMS

(71) Applicant: Telefonaktiebolaget LM Ericsson (publ), Stockholm (SE)

(72) Inventors: Leif Wilhelmsson, Dalby (SE); Miguel Lopez, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 236 days.

(21) Appl. No.: 15/032,203

(22) PCT Filed: Mar. 31, 2016

(86) PCT No.: PCT/EP2016/057072
§ 371 (c)(1),
(2) Date: Apr. 26, 2016

(87) PCT Pub. No.: WO2017/167376
PCT Pub. Date: Oct. 5, 2017

(65) Prior Publication Data
US 2018/0115445 A1    Apr. 26, 2018

(51) Int. Cl.
*H04L 27/00* (2006.01)
*H04L 5/00* (2006.01)
(Continued)

(52) U.S. Cl.
CPC ........ *H04L 27/0008* (2013.01); *H04L 5/0007* (2013.01); *H04L 27/12* (2013.01); *H04L 27/2607* (2013.01); *H04L 27/2628* (2013.01)

(58) Field of Classification Search
CPC . H04L 27/0008; H04L 27/12; H04L 27/2628; H04L 5/0007; H04L 27/2607
See application file for complete search history.

(56) References Cited

U.S. PATENT DOCUMENTS 9,525,540 B1 * 12/2016 Shellhammer ........ H04L 7/0012
9,729,268 B2 * 8/2017 Kenney ................. H04L 1/0003
(Continued)

FOREIGN PATENT DOCUMENTS

WO    2008130102 A1    10/2008

OTHER PUBLICATIONS

International Search Report and Written Opinion dated Dec. 5, 2016 for International Application Serial No. PCT/EP2016/057102, International Filing Date—Mar. 31, 2016 consisting of 15-pages.
(Continued)

*Primary Examiner* — Hashim Bhatti
(74) *Attorney, Agent, or Firm* — Christopher & Weisberg, P.A.

(57) ABSTRACT

A multi-modulation transmitter configured to transmit a multicarrier signal to multiple different receivers. At least one of the receivers is a receiver using a modulation scheme other than Orthogonal Frequency-Division Multiplexing (OFDM). The multi-modulation transmitter includes a data mapping unit configured to map data targeting the different receivers to mutually orthogonal subcarrier signals, in accordance with the respective modulation schemes of the different receivers. An Inverse Fast Fourier Transform unit is configured to transform the mutually orthogonal subcarrier signals to a multicarrier signal in the time domain. A cyclic prefix unit is configured to determine a Cyclic Prefix length of the multicarrier signal based on a symbol rate of the receiver using a modulation scheme other than OFDM, and to insert the determined Cyclic Prefix in the multicarrier signal. A radio unit is configured to transmit the multicarrier signal to the multiple different receivers.

22 Claims, 13 Drawing Sheets

(51) Int. Cl.
  *H04L 27/26* (2006.01)
  *H04L 27/12* (2006.01)

(56) References Cited

U.S. PATENT DOCUMENTS

| | | |
|---|---|---|
| 2005/0063345 A1 | 3/2005 | Wu et al. |
| 2006/0193375 A1 | 8/2006 | Lee |
| 2006/0203935 A1* | 9/2006 | Li .................. H04B 7/0617 |
| | | 375/299 |
| 2007/0211619 A1 | 9/2007 | Jalloul et al. |
| 2008/0200124 A1* | 8/2008 | Capretta ............ H04L 1/0003 |
| | | 455/41.3 |
| 2008/0279089 A1* | 11/2008 | Rosenhouse ......... H04M 11/062 |
| | | 370/203 |
| 2009/0109835 A1 | 4/2009 | Green |
| 2010/0046463 A1 | 2/2010 | Green |
| 2014/0016653 A1 | 1/2014 | Oh et al. |
| 2014/0211872 A1 | 7/2014 | Hassan et al. |

OTHER PUBLICATIONS

Robert Stacey, Intel, IEEE 802.11-15/0132r8 Wireless LANs "Specification Framework for TGax" Dated Sep. 22, 2015 consisting of 22-pages.

* cited by examiner

MULTI-MODULATION TRANSMITTER, RECEIVER AND METHODS FOR HANDLING MULTI-MODULATION IN WIRELESS COMMUNICATION SYSTEMS

TECHNICAL FIELD

The disclosure relates to methods, devices, and computer programs in wireless communications. More specifically, the disclosure relates to concurrent transmission of signals using different modulation schemes and to a corresponding multi-modulation transmitter and to a receiver for receiving transmissions from the multi-modulation transmitter.

BACKGROUND

Internet of Things, IoT, is expected to increase the number of connected wireless devices significantly. A number of devices, e.g. household appliances such as microwave ovens, operate at frequencies about 2.4 GHz. The electromagnetic emissions from these devices risk producing interference with wireless communication devices operating near the same frequency. To avoid interference from devices not intended for wireless communication certain frequency bands have been reserved for wireless communication purposes via international agreements. The use of the reserved frequency bands are regulated using licenses, which is why these bands are often called licensed bands. Analogously, bands not reserved and hence not regulated using licenses are called unlicensed bands. The 2.4 GHz band which is mainly intended to be used for industrial, scientific and medical applications, ISM, is an example of an unlicensed band.

A vast majority of the IoT-devices will likely operate in unlicensed bands, in particular the 2.4 GHz ISM band. At the same time, there is also increased demand for using the unlicensed ds for services that traditionally have been supported in licensed bands. As an example of the latter, 3GPP, that traditionally develop specifications only for licensed bands has now also developed versions of Long Term Evolution, LTE, which will operate in the 5 GHz unlicensed band.

Technologies that are expected to dominate for IoT services are Bluetooth Wireless Technology, in particular Bluetooth Low Energy, BLE, and future versions of IEEE 802.11 like 802.11ax. With respect to IEEE 802.11, there are currently efforts to standardize an integrated long range low power, LRLP, mode which at least to some extent builds upon the above mentioned 802.11ax.

IoT applications are foreseen to most often have rather different requirement and features compared to applications like e.g. file down-load and video streaming. Specifically, IoT applications would typically only require low data rate and the amount of data transmitted in a single packet may many times only be a few bytes. In addition, the transmissions to and from many devices will be very seldom, e.g. once an hour or even less often. However, the number of IoT devices is expected to be huge, which means that although the amount of data to each one of the devices may be small, the aggregated IoT data may still be substantial. Many use cases for IoT applications can be found in an ordinary home, and may be related to various sensors, actuators, etc. The requirements for coverage are therefore substantially less demanding than what usually can be achieved by e.g. a cellular system. On the other hand, the coverage which can be obtained by e.g. Bluetooth or 802.11b/g/n/ac may not suffice. This may be in particular true if one of the devices is outdoors whereas the other device is indoors so that an exterior wall with rather high penetration loss is in between the devices.

Due to this short-coming of current versions of Bluetooth Wireless Technology and IEEE 802.11, both these standardization organizations are working on new versions that would significantly increase the coverage.

The straightforward approach to increase the range of a communication link is to reduce the bit rate that is used. Reducing the bit rate by necessity means that it will take longer to transmit a packet of a certain size. As a side effect of this, the channel will be occupied for a longer time. Now, with a large number of devices sharing the same channel, the channel may be congested if this sharing is not done in an effective way. The need for long packets and the increased number of users will make this congestion even more pronounced.

Moreover, the amount of non-IoT data, e.g. data download and video streaming, transmitted over the same channel may also increase. This implies that to obtain good performance for both IoT applications and non-IoT applications, some coordination should preferably take place. Today there is no single standard that effectively supports both high-data rate application and really low cost IoT applications, like sensors. The main standard for the former is IEEE 802.11, e.g. 802.11n and 802.11ac, whereas the main standard for the latter is Bluetooth Low Energy. Hence, typically two systems need to operate in parallel and preferably in a synchronized fashion.

An obvious, and probably the simplest, way to do such coordination is by time sharing between the systems. For example, each system is assigned time slots where data may be transmitted or received according to a predetermined scheme. This is commonly referred to as Time Division Multiplexing, TDM. In each time slot assigned to a specific system, this system may then for instance use Time Division Duplex, TDD, which is a common way of implementing time sharing, wherein users are assigned time slots for uplink and downlink transmission. The main reason for TDD is that it allows for low cost implementation without the need for costly duplex filters, which are needed in case frequency division duplex, FDD, is employed. However, as the data rate for the IoT system is very low for the individual links, it may likely be hard to obtain good spectrum efficiency in this way.

Instead it would be preferable if the two systems, i.e., both the IoT system and the non-IoT system could operate concurrently. One means to achieve this could be if the non-IoT system would be based on orthogonal frequency division multiplexing, OFDM. Concurrent operation could then be achieved by assigning one or more subcarriers to the IoT system and the remaining ones to the non-IoT system. The amount of subcarriers allocated to the IoT system could in this way be rather flexible.

The approach of using OFDM is conceptually simple and is also the approach suggested for the Long Range Low Power mode currently discussed within IEEE 802.11. Although this clearly is an attractive property, it does not address the even more important question namely how to build extremely low cost and low power devices.

Hence, there is a need for network nodes that support concurrent operation with different types of wireless devices, one type able to transmit and receive high data rates such as OFDM, the other only able to transmit and receive considerably lower data rates.

SUMMARY

An object of the present disclosure is to provide methods and devices configured to execute methods and computer programs which seek to mitigate, alleviate, or eliminate one or more of the above-identified deficiencies in the art and disadvantages singly or in any combination.

This object is achieved by a multi-modulation transmitter configured to transmit a multicarrier signal to multiple different receivers, wherein at least one of the receivers is a receiver using a modulation scheme other than Orthogonal Frequency-Division Multiplexing, OFDM. The multi-modulation transmitter comprises a data mapping unit configured to map data targeting the different receivers to mutually orthogonal subcarrier signals, in accordance with the respective modulation schemes of the different receivers. The multi-modulation transmitter also comprises an Inverse Fast Fourier Transform, IFFT, unit configured to transform the mutually orthogonal subcarrier signals to a multicarrier signal in the time domain. The multi-modulation transmitter further comprises a cyclic prefix unit configured to determine a Cyclic Prefix, CP, length of the multicarrier signal based on a symbol rate of the receiver using a modulation scheme other than OFDM; and to insert the determined Cyclic Prefix in the multicarrier signal. The multi-modulation transmitter additionally comprises a radio unit configured to transmit the multicarrier signal to the multiple different receivers. The proposed transmitter enables a network node, which supports concurrent use of different types of wireless devices, one able to transmit and receive high data rates, the other only able to transmit and receive considerably lower data rates.

According to some aspects, at least one of the multiple different receivers is an OFDM receiver. OFDM e.g. 802.11ax, is a natural choice when high data rate is to be supported as it allows for relatively low complexity reception, which in turn depends on that the channel equalization is straightforward.

According to some aspects, the receiver using a modulation scheme other than OFDM has a lower data rate than the OFDM receiver. The receiver implementing a modulation scheme having a lower data rate, is e.g. a sensor device adapted to receive a Long Range Low Power signal, i.e. a "Bluetooth Low Energy, BLE, -like" signal, which unlike a standard BLE signal has features that allow for efficient reception of a signal transmitted from the multi-modulation transmitter.

According to some aspects, the OFDM receiver operates in accordance with IEEE 802.11 e.g. 802.11ax. Specifically, both the 802.11ax signal and the LRLP signal are generated by using an IFFT. In addition to the reduced complexity, it will, as mentioned above, ensure sufficient orthogonality between 802.11ax signal and the LRLP signal. This enables full reuse of existing 802.11ax hardware in a network node as well as low cost low power devices, e.g. Internet of Things, IoT, applications.

According to some aspects, the cyclic prefix unit is configured to select the Cyclic Prefix such that the duration of the output of the IFFT unit plus the duration of the Cyclic Prefix equals N times the symbol duration of the receiver using a modulation scheme other than OFDM, where N is an integer. The length of the cyclic prefix inserted in the signals for all the users using OFDM is chosen to ensure compatibility between the transmitted waveform and the characteristics of the receiver employed by users using a modulation scheme other than OFDM, so that the users using OFDM can successfully receive and decode their data.

According to some aspects, the data mapping unit is configured to map the data such that signals targeting receivers using a modulation scheme other than OFDM are separated in the frequency domain in accordance with predefined allocation rules. Different wireless devices can then be assigned different resource units. In particular, two different types of wireless devices, one using an OFDM modulation scheme and another using a modulation scheme other than OFDM, may be assigned resource units depending on the modulation scheme used by the respective wireless device. This also works for wireless devices using different mapping schemes for mapping respective data, e.g. a wireless device using Classic Bluetooth and another wireless device using Bluetooth Low Energy.

According to some aspects, the at least one receiver using a modulation scheme other than OFDM is a single carrier receiver. Single carrier transmission may be preferable for low data rates, which only require a narrowband channel. In particular, single carrier modulation which has a constant envelope has some desirable features from a transmission point of view due to less strict requirements on transmitter linearity. The relaxed requirements are typically used to drive a power amplifier, PA, in the non-linear region, which in turns allow for significantly higher power efficiency.

According to some aspects, the disclosure also relates to a network node in a wireless communication network comprising a multi-modulation transmitter according to the present disclosure. The network node comprises a multi-modulation transmitter and consequently has the same advantages as the multi-modulation transmitter.

According to some aspects, the disclosure also relates to a non-OFDM receiver using a modulation scheme other than Orthogonal Frequency-Division Multiplexing, OFDM. The non-OFDM receiver comprises a radio unit configured to receive a multicarrier signal possibly carrying data also targeting OFDM receivers. The non-OFDM receiver also comprises a frequency separation unit configured to separate signals carrying data targeting the non-OFDM receiver from the multicarrier signal. The non-OFDM receiver further comprises a demapping unit configured to, in a first reception mode, demap the signals targeting the non-OFDM receiver using a repetition code matching a symbol duration of the multicarrier signal. The repetition code is chosen to ensure compatibility between the characteristics of the non-OFDM receiver and the possibly targeted OFDM receivers, so that the wireless devices using a modulation scheme other than OFDM can successfully receive and decode their data.

According to some aspects, the demapping unit is configured to, in a second reception mode, use another repetition code. This enables a receiver that can receive both Long Range Low Power signals with e.g. a repetition code rate of 1/16 and a BLE signal with another code or no code at all. According to some aspects, the demapping unit is configured to switch between the first and second reception modes. This enables a switch between a legacy low power mode such as BLE and an LRLP mode, such that the wireless device can support communication with wireless devices and network nodes using different radio access protocols.

According to some aspects, the first and second reception modes use different modulation schemes. This enables a receiver that can receive signals using different modulation schemes such as Bluetooth using GFSK and Zigbee (defined in 802.15.4) using OQPSK and BPSK.

According to some aspects, the repetition code is such that N times the symbol duration of symbols of the first reception mode of the non-OFDM receiver equals the duration of an OFDM symbol of the multicarrier signal, wherein N is an integer. With matching durations, the OFDM signals and the signals using a modulation scheme other than OFDM can be processed by the IFFT unit into a multicarrier signal wherein the transmitted subcarriers are orthogonal.

Additionally, the receiver for LRLP may be based on reuse of hardware from a Bluetooth Low Energy receiver. Thus a signal can be generated that can be easily demodulated by a receiver compliant with BLE if the receiver treats the signal as repetition coded by a rate 1/16 code.

According to some aspects, the disclosure also relates to a wireless device comprising a non-OFDM receiver according to the present disclosure. According to some aspects, the repetition code is such that N times the symbol duration of symbols of the first reception mode of the non-OFDM receiver equals the duration of an OFDM symbol of the multicarrier signal, wherein N is an integer. The wireless device comprises a non-OFDM receiver and therefore has all the advantages of the non-OFDM receiver.

According to some aspects, the disclosure also relates to a method for transmitting a multicarrier signal to multiple different receivers; wherein at least one of the receivers is an Orthogonal Frequency-Division Multiplexing, OFDM, receiver and wherein at least one of the receivers is a receiver using another modulation scheme. The method comprises mapping data targeting the different receivers to mutually orthogonal subcarrier signals, in accordance with the respective modulation schemes of the different receivers. The method further comprises transforming the orthogonal carriers to a multicarrier signal in the time domain. The method also comprises determining a Cyclic Prefix, CP, length of the multicarrier signal based or the symbol rate of the receiver using another modulation scheme. The method additionally comprises inserting the determined Cyclic Prefix in the multicarrier signal. The method yet further comprises transmitting the multicarrier signal to the multiple different receivers. The method corresponds to the steps carried out by the multi-modulation transmitter and the method therefore has all the advantages of the multi-modulation transmitter.

According to some aspects, the disclosure also relates to a computer program comprising computer program code which, when executed, causes a multi-modulation transmitter to execute the method for transmitting a multicarrier signal to multiple different receivers according to the present disclosure. The computer program has all the advantages of the method it carries out.

According to some aspects, the disclosure also relates to a method for receiving a multicarrier signal carrying data to multiple different receivers; wherein at least one of the receivers is an Orthogonal Frequency-Division Multiplexing, OFDM, receiver. The method comprises receiving the multicarrier signal. The method further comprises separating signals carrying data targeting the non-OFDM receiver from the multicarrier signal. The method also comprises, in a first reception mode, demapping the signals targeting the non-OFDM receiver using a repetition code matching a symbol duration of the multicarrier signal. The method corresponds to the steps carried out by the non-OFDM receiver and the method therefore has all the advantages of the non-OFDM receiver.

According to some aspects, the disclosure also relates to a computer program comprising computer program code which, when executed, causes a wireless device comprising a non-OFDM receiver to execute the method for receiving a multicarrier signal carrying data to multiple different receivers according to the present disclosure. The computer program has all the advantages of the method it carries out.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
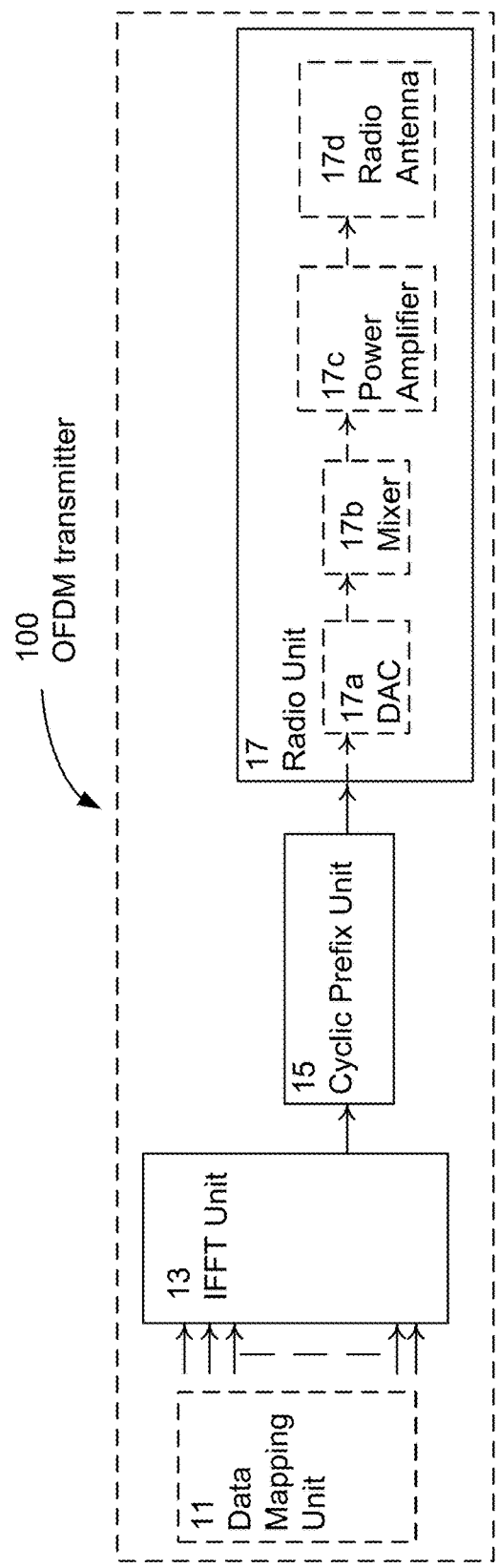
FIG. 1 illustrates an OFDM transmitter according to the prior art.

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

This disclosure proposes a dual mode transmitter for use in a radio access point, here referred to as a network node. The network node is typically "dual mode" in terms of supporting two types of devices; low data rate devices, also referred to as IoT devices and high data rate devices. The idea is based on a system design that makes dual mode implementations attractive. More specifically it is proposed to let long range low power transmissions use a modulation scheme that is optimized for the low cost node, i.e., the IoT device, but to do it in a way which makes complete reuse of the OFDM transmitter hardware. This allows the transmitter hardware in the network node to generate a completely different modulation than used for high data rate transmission by selecting the parameters for the long range low power modulation schemes in a specific way, By doing so, we ensure not only reuse of the transmitter hardware, but also that the different signals are perfectly orthogonal to one another.

For better understanding of the proposed transmitter a standard OFDM transmitter will now be described in more detail.

FIG. 1 illustrates an OFDM transmitter 100 according to the prior art. The OFDM transmitter 100 could for instance be compliant with 802.11ax, able to transmit and receive signals of 20 MHz or more, e.g. 40, 80, or even 160 MHz. The signals generated by the OFDM transmitter 100 being OFDM signals, typically generated by an inverse fast Fourier transform, IFFT, unit 13. First information in the form of digital data is mapped to different orthogonal subcarriers by a data mapping unit 11 according to a predetermined modulation scheme, e.g. a quadrature amplitude modulation, QAM, scheme. The information is then processed by the IFFT unit 13, which effectively transforms the signal from the frequency domain to the time domain After that a cyclic prefix, CP, is added by a Cyclic Prefix Unit 15. The signal is subsequently passed through a digital-to-analog converter, DAC, 17a after which it is up-converted in frequency to the carrier frequency by a so-called mixer 17b. Finally the signal is amplified by a power amplifier 17c before transmitted by a radio antenna 17d.

An OFDM and a single carrier transmission could be combined by not transmitting any OFDM signals on some of the subcarriers, i.e., effectively setting the corresponding frequency bins to zero in the IFFT.

Figure 2:
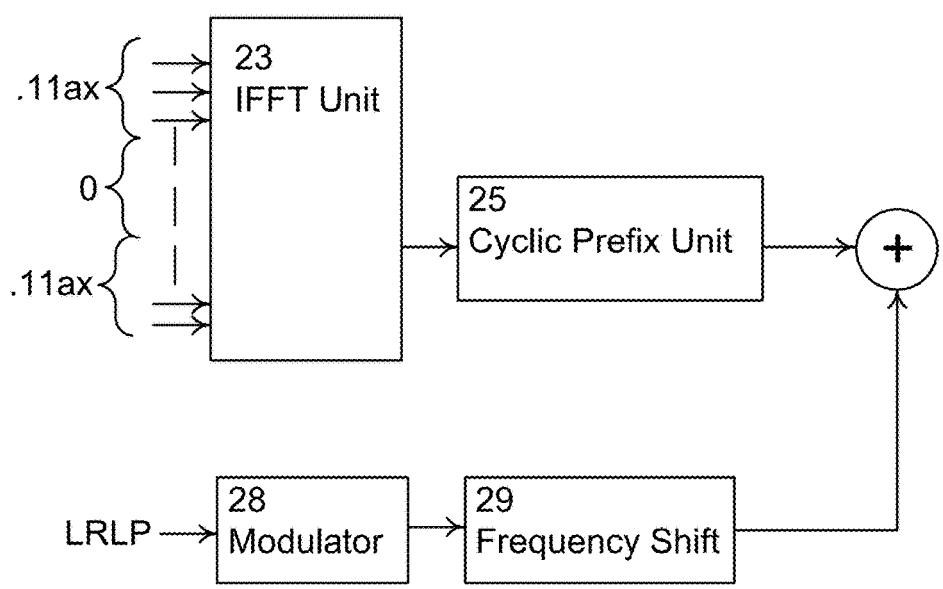
FIG. 2 illustrates how an LRLP signal can be added to an 802.11ax signal.

FIG. 2 illustrates how a low-rate single carrier signal can be added to an 802.11ax OFDM signal. The illustrated IFFT unit 23 and the cyclic prefix unit 25 represent the corresponding units of FIG. 1. The subcarriers on which no 802.11ax signal is transmitted will result in a "gap" in the spectrum. This gap can be placed where desired by simply setting the corresponding subcarriers to zero. The single carrier signal can then be added to the 802.11ax signal, by placing it in the above mentioned generated gap. One means to achieve this is to generate the single carrier signal at baseband, and then just shift it in frequency so that it fits in the gap. Thus, one modulator is used for each respective standard. Although conceptually simple, it means additional complexity. Moreover, although some of the subcarriers are not used by the high data rate signal, it does not mean that placing a low-rate signal in the gap will ensure that the signals do not interfere with one another, i.e., they will not necessarily be perfectly orthogonal.

Figure 3:
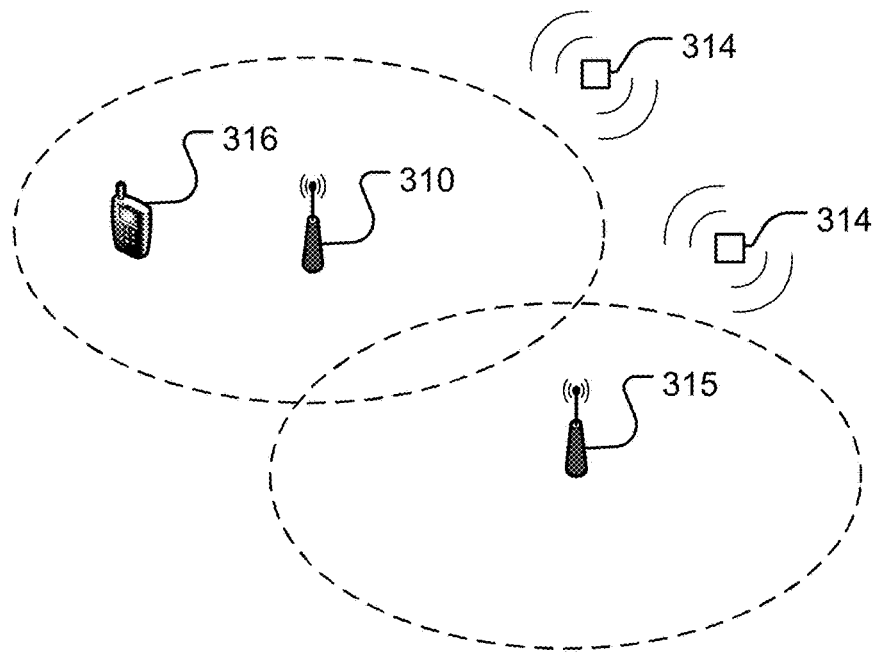
FIG. 3 illustrates a communication network where the inventive concept is applicable.

FIG. 3 illustrates a communication network where the inventive concept is applicable. The communication network comprises a network node 310 supporting two different types of wireless devices 314, 316, one able to transmit and receive high data rates 316, the other only able to transmit and receive considerably lower data rates 314. For example, the wireless device 316 able to transmit and receive high data rates is compliant with 802.11ax, and is thus able to transmit and receive signals where the nominal channel bandwidths are 20 MHz or more, e.g. 40, 80 or even 160 MHz and the wireless device 314 able to transmit and receive considerable lower data rates is able to transmit and receive using e.g. Gaussian frequency shift keying, GFSK, which is the modulation used in e.g. Bluetooth Low Energy, BLE, i.e. the wireless device 314 is a so called Long Range Low Power, LRLP, wireless device. The wireless device 314 is e.g. an IoT device. In FIG. 3 wireless devices 314 are illustrated to be farther away from the network node 310 than wireless device 316. This is to highlight that the LRLP wireless device 314, due to its potentially much lower rate may have improved range compared to wireless device 316, but the relative placement of the different wireless devices has no impact on the proposed technique as such.

The communication network also comprises a network node 315 which is only configured for communication with a communication scheme suitable for low power wireless devices 314. While a legacy low power wireless device might only be able to receive signals from a legacy network node 315, the illustrated LRLP devices 314 need to be able to receive signals from both network nodes 310, 315. In order to achieve this some adaption may be required. This will be described in further detail in FIG. 8.

OFDM is a natural choice when high data rate is to be supported as it allows for relatively low complex reception, which in turn depends or that the channel equalization is straightforward. On the other hand, for low data rates, which only require a narrowband channel, single carrier transmission may be preferable. In particular, single carrier modulation which has a constant envelope has some desirable features from a transmission point of view due to less strict requirements on transmitter linearity. The relaxed requirements are typically used to drive a power amplifier, PA, in the non-linear region, which in turns allow for significantly higher efficiency. An example of such a modulation is frequency shift keying, where the information is transmitted in the instantaneous frequency content of the signal. Another example is certain forms of phase shift keying, where the change of phase is done in a way such the envelope is not changed. Naturally, as the frequency is just the derivative of the phase with respect to time, one may even treat the modulation as either phase or frequency modulation depending on how the reception is performed.

At the same time Bluetooth Wireless Technology is based on Gaussian Frequency Shift Keying, GFSK. GFSK is a constant envelope modulation which allows for extremely cost efficient implementations. At the receiver side, one may use a simple limiting receiver, i.e., the analog-to-digital converter, ADC, may be replaced by a simple comparator and there may essentially be no need for automatic gain control, AGC, in the receiver, further simplifying the implementation and reducing the cost. Even more significant is the gain at the transmitter side. Due to that GFSK is constant envelope, there is no need to back-off the power amplifier, PA, and the linearity requirements for the PA are considerably less stringent, so that significantly higher power efficiency can be obtained. OFDM is known to suffer severely from a high peak-to-average-ratio, PAR, which means that less efficient transmission. Since an IoT device, such a sensor, may be powered by a coin battery, power efficiency is one of the key features.

As mentioned above LRLP is a new topic interest group within the IEEE 802.11 working group that will address the needs of Machine-to-Machine, M2M, IoT, Energy Management, and Sensor applications. LRLP is intended to leverage the mass-market Wireless Local Area Network, WLAN, infrastructure for reliable, consistent, and stable access to Internet and "Cloud" services. It has been identified that such an LRLP amendment should preferably be made such that LRLP support in the network node can be added at essentially no cost by reusing selected parts of the key features of the physical layer from 802.11ax. Although this clearly is an attractive property, it does not address the even more important question namely how to build extremely low cost and low power devices. As the 802.11 technology, in particular 802.11ax, has some non-desirable properties for low cost and especially low power, it does not seem feasible for the low cost device.

As the exact format of LRLP is not yet defined, the term LRLP in this application relates to a long range low power non-OFDM signal using any suitable single carrier modulation. For example it could be a "BLE-like" signal i.e. a signal using the same modulation scheme as Bluetooth Low Energy, BLE adapted for concurrent operation with OFDM.

This disclosure proposes to base LRLP on a modulation scheme that is optimized for the low cost node, i.e., the IoT device, but do it in a way which makes complete reuse of the OFDM receiver hardware in the network node possible. In this disclosure the examples are mainly using 802.11ax for the high-data rate application and "Bluetooth Low Energy-like" signals for the low data rate communication (also referred to as LRLP). However, it must be appreciated that the same principles are applicable to other present and future standards as well.

In contrast to the structure illustrated in FIG. 2, the present disclosure presents an effective means to generate both signals in a way that ensures that they are orthogonal to one another. In doing so, it is ensured that both kinds of transmissions can be received with receivers that are optimized for their respective purpose by ensuring that the respective signals are orthogonal although fundamentally different modulations are being used. The present disclosure proposes to base LRLP on a modulation scheme that is optimized for the low cost node, e.g., a sensor of an Internet of things, IoT, application, but do it in a way which makes complete reuse of 802.11ax transmitter hardware in the network node 310 possible. That is, the transmitter hardware in the network node 310 is allowed to generate a completely different modulation than used in 802.11ax, by selecting the parameters for the new modulation schemes in a specific way. By doing so, reuse of the transmitter hardware is enabled and the 802.11ax signal and the LRLP signals are sufficiently orthogonal to one another.

Figure 4:
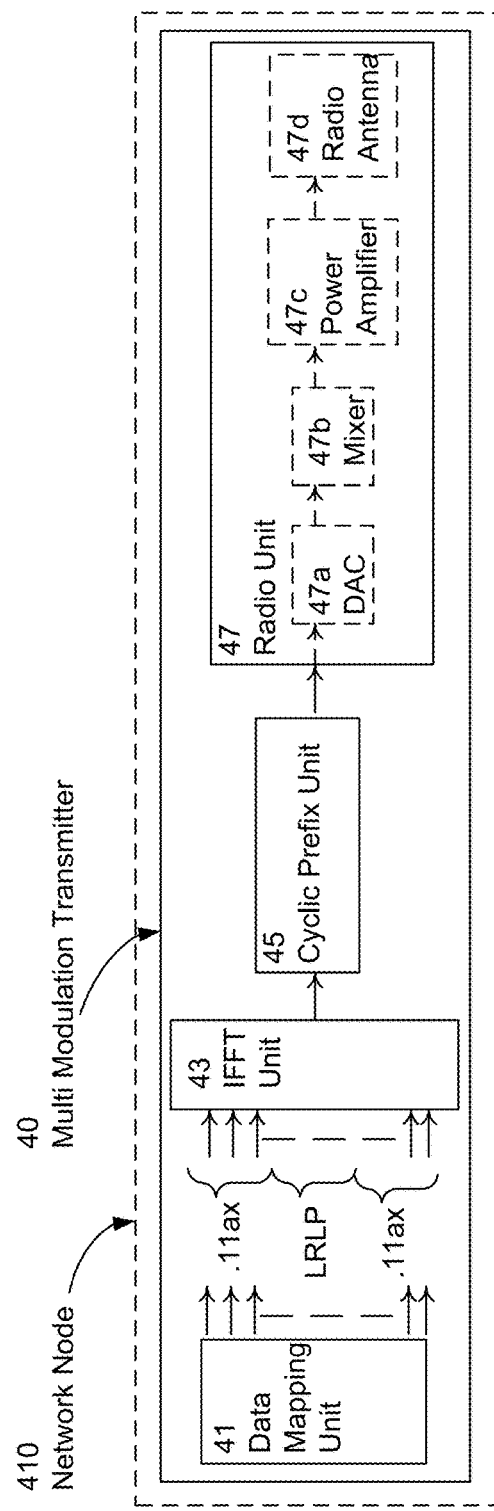
FIG. 4 illustrates a multi-modulation transmitter and a network node according to some aspects of the disclosure, respectively.

FIG. 4 illustrates a multi-modulation transmitter 40 and a network node 410 according to some aspects of the disclosure, respectively. The multi-modulation transmitter 40 is configured to transmit a multicarrier signal to multiple different receivers; wherein at least one of the receivers is a receiver using a modulation scheme other than Orthogonal Frequency-Division Multiplexing, OFDM. According to some aspects, the multi-modulation transmitter 40 is comprised in a network node 410.

The multi-modulation transmitter 40 comprises a data mapping unit 41 configured to map data targeting the different receivers to mutually orthogonal subcarrier signals, in accordance with the respective modulation schemes of the different receivers. In other words, the data mapping unit 41 converts or maps the data to be transmitted to symbols in accordance with the modulation scheme (also referred to as constellation). The symbols are mapped to different subcarriers. In OFDM one time slot on one subcarrier is typically referred to as a resource element and it is the smallest unit within OFDM.

Scheduling of a number of resource elements for a specific purpose (e.g. a channel and/or user), is typically performed by a so-called scheduler (not shown), which typically resides in the network node 410, Singe resource elements are typically considered too small units to be allocated individually, e.g. to a wireless device. Therefore so-called resource block comprising a set of resource elements is defined, wherein each resource block may carry a set of symbols.

Examples of different modulation schemes are Quadrature Phase-Shift Keying, QPSK, 16 Quadrature Amplitude Modulation, 16 QAM and 64 Quadrature Amplitude Modulation, 64 QAM. A constellation diagram is a representation of a signal modulated by a digital modulation scheme such as quadrature amplitude modulation or phase-shift keying.

In QPSK, the signal is shifted among different phase states. Quadrature here means that there are four phase states separated 90 degrees with respect to each other. The four phase states can each represent a two-bit state, i.e. 00, 01, 10 and 11 in binary digits, respectively. QPSK can thus carry 2 bits/symbol. The idea behind QAM is that each symbol can represent more bits by varying both phase and amplitudes at the same time. The numbers 16 and 64 in 16 QAM and 64 QAM represent the number of available states, which translates to each symbol representing $2^4$ and $2^6$ bits, respectively. Theoretically, more bits per symbol imply a higher data rate. The proposed transmitter enables a network node which supports concurrent use of different types of wireless devices, one able to transmit and receive high data rates, the other only able to transmit and receive considerably lower data rates.

Hence, typically one or a few subcarriers are allocated for transmission to receivers using a modulation scheme other than OFDM. The other subcarriers are allocated for OFDM transmission to receivers using OFDM. The data mapping unit 41 maps data targeting the different receivers to resource elements on their respective subcarriers, using a constellation scheme of the respective systems.

In one example the multi-modulation transmitter 40 is arranged to transmit a multicarrier signal comprising OFDM modulated 802.11ax signals and LRLP signals. The LRLP signal is referred to as "BLE-like" in the sense that it uses the same modulation scheme as BLE and thus BLE hardware can be used to receive the signal. However, for successful reception, the duration of the LRLP signal needs to fit to the OFDM symbol duration. This will not work with BLE directly. The idea is to introduce repetition coding to solve this as will be explained below. The data of the 802.11ax signals is mapped to symbols using 64 QAM and the data of the LRLP signals is mapped to symbols using Gaussian Frequency-Shift Keying, GFSK. The symbols targeting an 802.11ax system and the symbols targeting a LRLP system have different durations and are mapped to mutually orthogonal subcarriers of the multicarrier signal. The same LRLP symbol is repeated an integer number N times such that the duration of the N LRLP symbols equals the duration of an OFDM symbol.

According to some aspects, at least one of the multiple different receivers is an OFDM receiver. OFDM is a multicarrier frequency modulation scheme where subcarriers carrying the signal are closely spaced, typically overlapping, modulated carriers. Since data that is to be transmitted with an OFDM signal is distributed over the subcarriers, the data rate of each subcarrier is reduced, which greatly reduces the sensitivity to interference due to reflections, as well as inter symbol and inter frame interference. The closely spaced subcarriers of OFDM also lead to good spectral efficiency. OFDM is therefore a natural choice when high data rate is to be supported as it allows for relatively low complex reception, which in turn depends on that the channel equalization is straightforward.

According to some further aspects, the OFDM receiver operates in accordance with IEEE 802.11 or 802.11ax. One typical implementation is that the multi-modulation transmitter 40 is arranged to transmit a multicarrier signal comprising an OFDM signal compliant with 802.11ax, suitable for high data rates. The data of the 802.11ax signal is mapped according to one of quadrature amplitude modulation, QAM, quadrature phase-shift keying, QPSK, or binary phase-shift keying, BPSK, While QAM supports higher data rates, BPSK and QPSK may provide better robustness.

According to some aspects, the receiver using a modulation scheme other than OFDM has a lower data rate than the OFDM receiver. The lower data rate facilitates implementation of a Long Range Low Power, LRLP, e.g. "BLE-like" transmitter. The lower data rate provides an approach to increase the range of a communication link. Since a low data rate can be supported by using a single subcarrier, employing a single subcarrier using a suitable modulation scheme provides a means to improve energy efficiency. According to some further aspects, the data of the LRLP signal is mapped based on Gaussian frequency shift keying, GFSK. The advantages of a Bluetooth Low Energy like signal having a constant envelope has been described above and mapping the LRLP signal based on GFSK provides the advantageous properties of Bluetooth Low Energy like signal.

Now turning back to FIG. 4, the multi-modulation transmitter 40 also comprises an Inverse Fast Fourier Transform, IFFT, unit 43 configured to transform the mutually orthogonal subcarrier signals to a multicarrier signal in the time domain. In other words, after the data has been split up into sub-streams of data and passed the data mapping unit 41, mapping the sub-streams of data to respective subcarriers, the amplitude and phase of each subcarrier is transformed into a time domain signal. The IFFT unit 43 converts a number of complex data points into a time domain signal having the same number of points. Each data point in the frequency spectrum for an IFFT (or an FFT) is often called a bin. Since each bin of an IFFT corresponds to the amplitude and phase of one orthogonal sinusoid, provided by the IFFT, a reverse process, i.e. an FFT, can be used to extract the orthogonal subcarriers.

Although the signals generated in FIG. 4 will be perfectly orthogonal, they may not be suitable for LRLP, since the 802.11ax symbol durations typically differ from the LRLP symbol durations.

Figure 5:
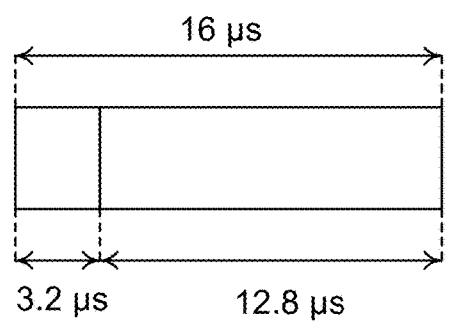
FIG. 5 illustrates cyclic prefix and data block durations of an OFDM symbol.

This problem can be remedied by a suitable choice of cyclic prefix, which will be further illustrated in relation to FIG. 5 below. Accordingly, the multi-modulation transmitter additionally 40 comprises a cyclic prefix unit 45 configured to determine a Cyclic Prefix, CP, length of the multicarrier signal based on a symbol rate of the receiver using a modulation scheme other than OFDM; and to insert the determined Cyclic Prefix in the multicarrier signal. The symbol durations of the LRLP symbols are typically much shorter than those of the 802.11ax symbols. The mismatch can be remedied to some extent by repeating the same LRLP symbol a number of times such that the total duration for the set of repeated LRLP symbols approximates the 802.11ax symbol duration as close as possible. The reason for repeating an LRLP symbol is that the low rate system then can treat the corresponding signal as a symbol being repeated a certain number of times, i.e., repetition coded. The duration of the LRLP symbols depend on the symbol rate of the receiver using a modulation scheme other than OFDM. Thus, the number of LRLP symbols needed to approximate an OFDM symbol duration depends on the symbol rate of the receiver using a modulation scheme other than OFDM. The OFDM symbol duration is e.g. a sum of the duration of the OFDM symbol at the output of the IFFT and a duration of the cyclic prefix. Since the duration of the IFFT output is fixed, the only way to change the total duration of an OFDM symbol is to choose a cyclic prefix having a desired duration.

Since repeating the LRLP symbols to match the OFDM symbol duration practically means repeating the LRLP symbols to match the OFDM symbol duration, which is fixed, any mismatch between the duration of the repeated LRLP symbols and the duration of the IFFT output must be compensated by a suitable choice of cyclic prefix. The cyclic prefix is determined based on how long the duration of the OFDM symbol needs to be for it to match the duration of the repeated LRLP symbols, Since the number of LRLP symbols was dependent on the symbol rate of the receiver using a modulation scheme other than OFDM, the choice of cyclic prefix is based on said symbol rate.

The multi-modulation transmitter 40 further comprises a radio unit 47 configured to transmit the multicarrier signal to the multiple different receivers. The radio unit comprises units needed to convert the digital signal to a radio signal that can be transmitted by an antenna (not shown).

The determination of the Cyclic Prefix, will now be described in further detail. FIG. 5 illustrates cyclic prefix and data block durations of an OFDM symbol. As stated above, orthogonality between signals using an OFDM modulation scheme and signals using a modulation scheme other than OFDM can be resolved by a suitable choice of cyclic prefix, CP. The total duration of an OFDM symbol equals the duration of the signal at the output of the IFFT unit 43 plus the duration of the CP. The reason for this is to simplify reception by ensuring that inter symbol interference, ISI, easily can be dealt with. The CP can be seen as overhead and does reduce the net data rate. Because the CP is overhead, it should be selected as short as possible, but still long enough to ensure that ISI easily can be handled at the receiver side. In practice this means selecting the length of the CP to be at least as long as the channel's excess delay, i.e., the length of the channel's impulse response where the impulse response is essentially non-zero. Determination of the cyclic prefix will be illustrated for 802.11ax. For 802.11ax, it has been decided that the CP length can be 0.8 µs, 1.6 µs or 3.2 µs. The illustrated OFDM symbol consists of a 12.8 µs long "useful" part which is the output of the IFFT unit before the cyclic prefix is added. According to the proposed technique, the selection of CP length is not only based on that channel conditions but also on the symbol rate of the low data rate system, i.e., the system that is not actually based on OFDM.

According to some aspects, the cyclic prefix unit 45 is configured to select the Cyclic Prefix such that the duration of the output of the IFFT unit 43 plus the duration of the Cyclic Prefix is N times the symbol duration of the receiver using a modulation scheme other than OFDM, where N is an integer. The reason for this choice is that the low rate system then can treat the signal as a symbol being repeated N times, which allows simple processing and also ensures that symbol boundary for the OFDM symbols are aligned with the symbol boundary with the low rate system. If N is not an integer it follows that effectively the LRLP signal would experience a discontinuity in between (some of) the OFDM symbols.

For the example above, suppose that the symbol rate for LRLP is 1 Msymbol/s, then it is easily seen that only CP=3.2 µs results in N being an integer as 12.8 µs+3.2 µs=16 µs, N=16.

To further describe the proposed technique, consider a nominal channel bandwidth of 20 MHz and that the signal is generated using a 256 point inverse fast Fourier transform, IFFT, so that the subcarrier spacing becomes 20/256 MHz=78.125 kHz. Then the duration of one OFDMA symbol is 256/20 µs=12.8 µs, not including the cyclic prefix. This corresponds to what is used in 802.11ax.

As is proposed for IEEE 802.11ax, orthogonal frequency division multiple access, OFDMA, is used to allow simultaneous transmission to and from several wireless devices.

According to some aspects the disclosure also relates to a network node 410 in a wireless communication network comprising a multi-modulation transmitter 40 according to the present disclosure. A network node in this application generally refers to a radio base station or access point, i.e. a radio network node capable of transmitting radio signals to a wireless device and receiving signals transmitted by a wireless device.

Figure 6:
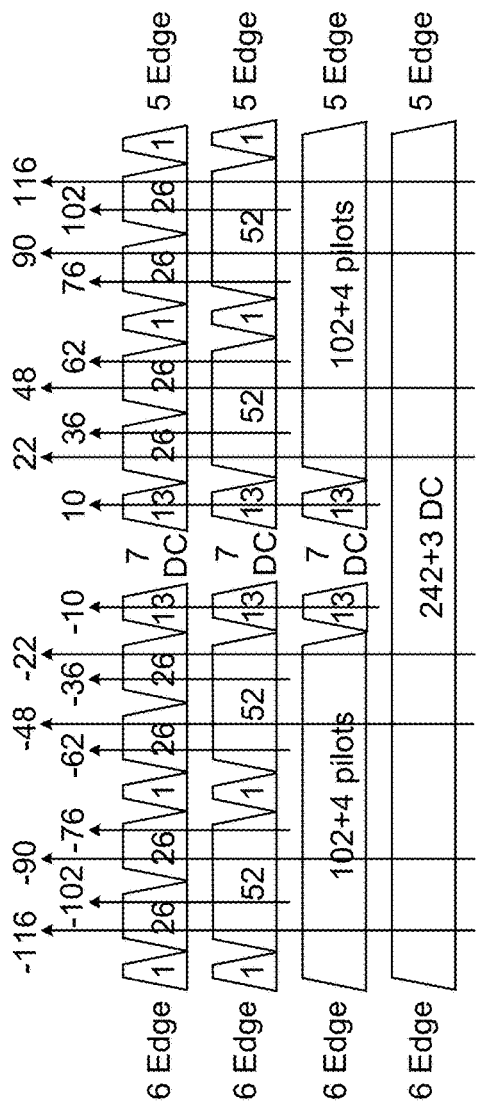
FIG. 6 illustrates different possible allocations of resources according to some aspects of the disclosure.

FIG. 6 illustrates different possible allocations of resources according to some aspects of the disclosure. A case of 20 MHz allocation is chosen to illustrate the principles of the proposed technique. The frequency domain within the available bandwidth is divided into resource units. The resource units are then assigned different purposes, e.g. a resource unit may be allocated to transmit information to or from a wireless device. If two resource units are for communication with IRLP devices, it may be beneficial to separate these resource units in the frequency domain. Hence, according to some aspects of this disclosure, the data mapping unit of a multi-modulation transmitter is configured to map the data such that signals targeting receivers using a modulation scheme other than OFDM are separated in the frequency domain in accordance with predefined allocation rules. The actual definition of the resource units and their assignment follow different predefined allocation rules depending on desired behavior.

Figure 7:
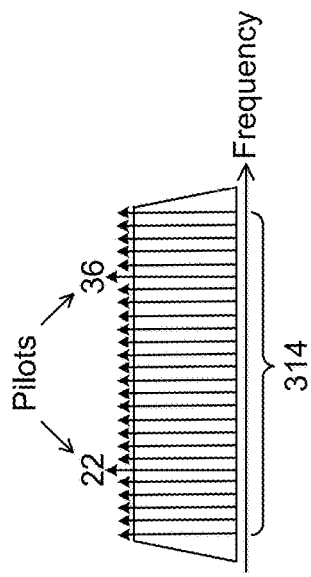
FIG. 7 illustrates a 26 subcarrier wide resource unit according to some aspects of the disclosure.

This will now be further explained referring to FIGS. 6 and 7. Depending on how much information should be transmitted to a high rate wireless device, the wireless device can be allocated more or less of the total available bandwidth. According to FIG. 6, the smallest resource unit, RU, is 26 subcarriers, which corresponds to a bandwidth of about 2 MHz (26*78.125 kHz=2.031 MHz). In general, a wireless device may be allocated a 26 subcarrier RU, a 52 subcarrier RU, a 106 subcarrier RU, or the full bandwidth which corresponds to 242 subcarriers. Although we may assume that a network node supports transmission and reception over the entire 20 MHz bandwidth, we are only concerned with the transmission from the network node to the two different kinds of wireless devices. If there are two or more wireless devices of one kind, this can also be supported by the very same methodology.

In FIG. 6, which is a rather detailed illustration of possible allocation of users in a 20 MHz channel, the exact usage of the different subcarriers is shown. The different RU sizes mentioned above and how they are placed are clearly shown, as are the location of the pilot tones, in FIG. 6 marked as arrows. Pilot tones are tones that are known by the receiver and therefore can be used by the receiver to perform e.g. channel estimation. If only 802.11ax wireless devices were to be supported, the different RU could be allocated to different wireless devices in a suitable way, with possibly varying RU sizes allocated to the different wireless devices. In what follows, suppose that the $6^{th}$ RU consisting of 26 subcarriers is not used for an 802.11ax wireless devices, but instead the corresponding frequencies are to be used to generate a signal that can be demodulated by a receiver for LRLP.

This 26 subcarrier RU is shown in some more detail below, see FIG. 7. This would correspond to a subcarrier separated in the frequency domain in accordance with predefined allocation rules.

The present disclosure also relates to a wireless device 314 configured for receiving data transmitted from the multi-modulation transmitter 310 described above. A situation where this is needed is when a Long Range Low Power, LRLP, wireless device tries to communicate with a network node comprising a multi-modulation transmitter according to the present disclosure. Referring to FIG. 3, the wireless device 314 is for example a wireless device implementing an Internet of things, IoT, application. The data rate needed to be received by the wireless device 314 is typically very low, such as a long range low power, LRLP, wireless device. Typically, such wireless IoT devices are configured to receive signals having a modulation scheme suitable for LRLP communication. For example the wireless devices 314 are configured to receive data from a legacy network node 315 transmitting signals to the LRLP wireless device 314 using e.g. GFSK, i.e. the same type of modulation as used in Classic Bluetooth or Bluetooth Low Energy.

In the example of FIG. 3 the network node 310 transmits a multicarrier signal comprising data targeting the wireless device 314. Hence, the wireless device 314 needs to be able to receive and extract information from a multicarrier signal transmitted by the multi-modulation transmitter 310. This will be further explored in relation to FIG. 8, below.

Figure 8:
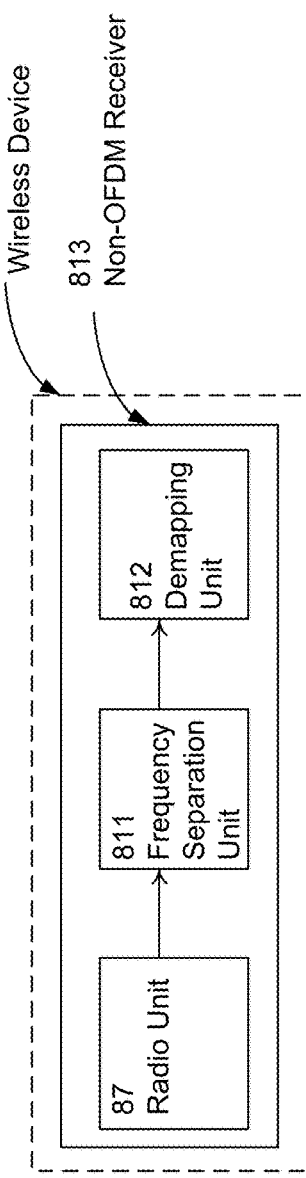
FIG. 8 illustrates a non-OFDM receiver and a wireless device according to some aspects of the disclosure, respectively.

FIG. 8 illustrates a non-OFDM receiver 813 and a wireless device 814 comprising the non-OFDM receiver 813 according to some aspects of the disclosure, respectively. The non-OFDM receiver 813 is for example one of the receivers using a modulation scheme other than OFDM, to which a multi-modulation transmitter 310 according to the present disclosure, as has been illustrated in relation to FIG. 4 above, transmits a multicarrier signal. The principle is similar to when receiving a single carrier signal.

The non-OFDM receiver 813 comprises a radio unit 87 configured to receive a multicarrier signal possibly carrying data also targeting OFDM receivers. The radio unit 87 receives the electromagnetic signal, converts it into a digital signal and performs receiver operations such as amplification. Note that this does not imply that the multicarrier signal is actually fully received and decoded. In principle it only means that the radio antenna receives the analog multicarrier signal.

The non-OFDM receiver 813 also comprises a frequency separation unit 811 configured to separate signals carrying data targeting the non-OFDM receiver from the multicarrier signal. The non-OFDM receiver 813 is arranged to receive the multicarrier signal from the multi-modulation transmitter and separate out non-OFDM signals carrying data targeting the non-OFDM receiver 813 from the multicarrier signal. This could be compared to filtering out a single carrier, which would be the case when receiving a LRLP signal transmitted in a conventional manner. The separation of signals is performed by the frequency separation unit 811, which typically is just a filter.

The non-OFDM receiver 813 further comprises a demapping unit 812 configured to, in a first reception mode, demap the signals targeting the non-OFDM receiver 813 using a first repetition code matching a symbol duration of the multicarrier signal. The non-OFDM signals that are filtered out by the frequency separation unit 811 are then processed by the demapping unit 812, which demaps the non-OFDM signals. Typically the data targeting the non-OFDM receiver is only transmitted on one or a few carriers. The demapping of the non-OFDM signals requires that the symbols of the non-OFDM signals are identified and that data carried by the respective symbols are extracted by demapping the symbols in accordance with the modulation scheme (e.g. FSK, MSK)

of the symbols, which is used for the non-OFDM communication. Once the correct symbols have been determined, each symbol is demapped in accordance with the modulation scheme of the symbols. In other words, mapping is a process that maps a (digital) data stream to an (analogue) representation called a symbol. Demapping is an inverse mapping, where data carried by the symbols is extracted or interpreted.

The first repetition code is used in the identification of the symbols. In principle the repetition code implies that the receiver assumes that each symbol is repeated N times as described above. In other words, the repetition code is used to repeat the symbols using a modulation scheme other than OFDM N times such that the duration of the N symbols equals the duration of an OFDM symbol, wherein N is an integer. Each of the signals separated by the frequency separation unit 811 carries N symbols. Since the repetition code determines how many times a symbol is to be repeated, it is straightforward to determine which parts of the signals that correspond to a symbol. Since there are N repeated symbols, the determined symbols may be compared with each other to increase the probability that a correct symbol has been determined. For instance, if N=16 and 15 symbols is determined as symbol A and only one is determined as symbol B, then it may be concluded that it is likely that it is symbol A that has been repeated 16 times and the determination of symbol B is an error.

The first repetition code is chosen by a multi-modulation transmitter to ensure compatibility between the transmitted waveform and the characteristics of the receiver employed by users using a modulation scheme possibly being OFDM, so that the users using a modulation scheme possibly being OFDM can successfully receive and decode their data. Hence, the non-OFDM receiver needs to be configured to apply the first repetition code chosen by the multi-modulation transmitter.

According to some aspects, the first repetition code is chosen such that N times the symbol duration of symbols of the first reception mode of the non-OFDM receiver equals the duration of output of an IFFT plus the duration of a cyclic prefix, CP, of an OFDM symbol of the multicarrier signal, wherein N is an integer.

According to some aspects, the non-OFDM receiver is arranged to receive multicarrier signals from a multi-modulation transmitter by changing the repetition code to match that of an OFDM symbol duration of the multicarrier signal. Starting from a legacy receiver arranged to receive a single carrier signal using the same modulation scheme as the LRLP receiver, there is no need for hardware modifications. An appropriate tuning of reception parameters turns the legacy receiver into a LRLP receiver according to the present disclosure.

According to some aspects, the demapping unit 812 is configured to, in a second reception mode, use another repetition code, here referred to as a second repetition code. In order for the non-OFDM receiver to be able to also receive signals from legacy transmitters transmitting signals using e.g. BLE, a second reception mode using another repetition code may be provided. In the second reception mode there is no need to match receiver parameters with a concurrent OFDM transmission. Hence, repetition codes can be set to e.g. 1/1.

According to some aspects, the demapping unit 812 is configured to switch between the first and second reception modes. For example the demapping unit 812 is configured to switch between a Long Range Low Power "BLE-like" mode and a legacy Bluetooth mode, e.g. Classic Bluetooth or Bluetooth Low Energy. By being able to switch between the first and second reception modes, the non-OFDM receiver can communicate with both legacy transmitters, e.g. the legacy network node 315 in FIG. 3, and multi-modulation transmitters according to the present disclosure. Since the reception modes can be configured by adjusting reception parameters, e.g. the repetition code, the need for additional hardware with respect to legacy receivers is eliminated. In other words, the purpose is that the same hardware can be used for both LRLP, which may be an 802.11 standard, and e.g. BLE, which is a Bluetooth standard. However, LRLP is not compatible with BLE. It is just that the hardware can be reused, and one can reconfigure the receiver comprising one and the same hardware to be usable with any of the two standards.

The switching may be performed in different ways. Typically it could be quite seldom. In principle only one mode could be used all the time. But it could also be so that the second mode is chosen dynamically and used in between sessions of a first mode.

According to some aspects, the first and second reception modes use different modulation schemes or coding schemes. The two modes could also implement different standards, where LRLP may be an IEEE 802.11 amendment whereas the legacy standard may be some version of Bluetooth, e.g. Classic Bluetooth and Bluetooth Low Energy, BLE. This enables a receiver that can receive signals using different modulation schemes, e.g. a GFSK signal in a first mode and an O-QPSK signal in a second mode. Alternatively, it may use GFSK in both modes, but different coding schemes.

According to some aspects, the present disclosure also relates to a wireless device 814 comprising a non-OFDM transmitter 813 according to the present disclosure. Within the context of this disclosure, the terms "wireless terminal" or "wireless device" encompass any terminal which is able to communicate wirelessly with another device, as well as, optionally, with an access point of a wireless network) by transmitting and/or receiving wireless signals. Thus, the term "wireless terminal" encompasses, but is not limited to: a user equipment, e.g. an LTE UE, a mobile terminal, a stationary or mobile wireless device for machine-to-machine communication, an integrated or embedded wireless card, an externally plugged in wireless card, a dangle etc. Throughout this disclosure, the term "user equipment" is sometimes used to exemplify various embodiments. However, this should not be construed as limiting, as the concepts illustrated herein are equally applicable to other wireless nodes. Hence, whenever a "user equipment" or "UE" is referred to in this disclosure, this should be understood as encompassing any wireless terminal as defined above. The wireless device 914 has all the advantages of the non-OFDM transmitter 913.

The wireless device is not limited to comprise those components, but may typically also comprise any other hardware such as sensors and communication circuits. This is however unimportant for this disclosure.

Example Implementation Using Binary Frequency-Shift Keying

The example implementation will be illustrated for a high data rate system using an OFDM modulation scheme and a low data rate system using a modulation scheme other than OFDM.

According to some aspects, the modulation used for a low data rate system is based on binary FSK, i.e., a logical zero is transmitted using one subcarrier and a logical one is transmitted using another subcarrier, i.e., one of the two subcarriers is used but not both at the same time. As all subcarriers by construction are mutually orthogonal when generated by an IFFT, it may seem that it does not really matter what subcarriers to select. However, whether this is true in practice will depend on how the reception is performed. If one of the main objectives is to allow for a receiver implementation that allows low cost and low power consumption, it may be desirable that the two subcarriers are separated at a certain distance, as will be discussed further below. Also, due to that the frequencies of the different subcarriers are determined by the high data rate system, one needs to find the most suitable subcarriers of those available although they may not coincide with what had been chosen without this restriction. Note that these aspects also cover the situation where the spectrum of the transmitted signal is shaped, e.g. through the use of windowing between the OFDM symbols. A receiver for the signal may or may not be perfectly aware of the signal waveform. This will also be discussed below.

Figure 9:
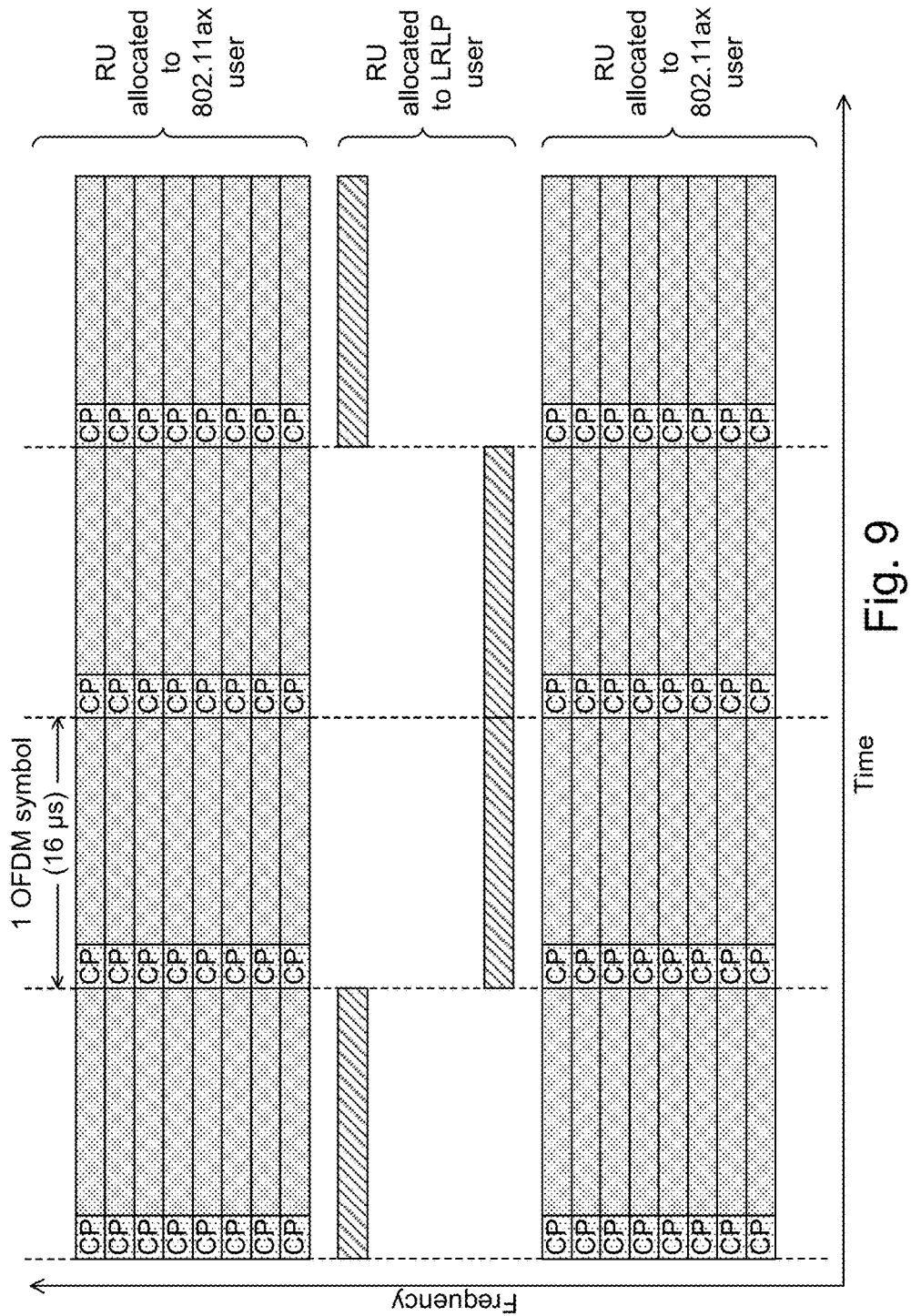
FIG. 9 illustrates resource unit allocation in the time-frequency plane according to some aspects of the disclosure.
Figure 10:
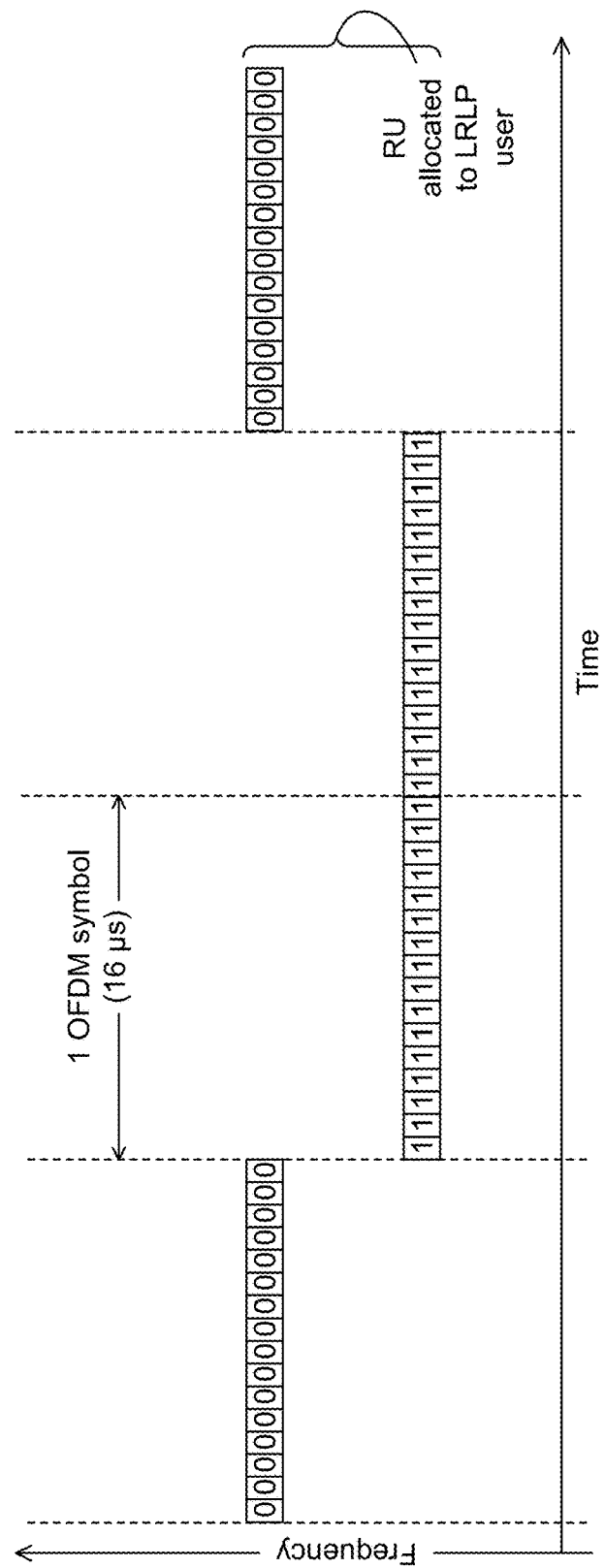
FIG. 10 illustrates an LRLP signal according to some aspects of the disclosure.

FIG. 9 illustrates resource unit allocation in the time-frequency plane according to some aspects of the disclosure. The low data rate system, denoted LRLP, only uses one subcarrier for a logical one or a logical zero, respectively. The symbol of the LRLP system, i.e. the zero or one, has a shorter duration than the OFDM symbol of the high data rate system and is repeated as many times as it takes to match the duration of the OFDM symbol, i.e. the duration of the OFDM symbol and the cyclic prefix, FIG. 10 illustrates an LRLP signal according to some aspects of the disclosure. FIG. 10 exemplifies how an LRLP receiver interprets the received signal. Each OFDM symbol is interpreted as the repetition of several logical zeros or ones. The LRLP symbols are repeated 16 times to match the OFDM symbol duration.

Returning to FIG. 9, as a first example, the receiver for LRLP is based on reuse of hardware from a Bluetooth Low Energy, BLE, receiver. Specifically, the receiver assumes a symbol rate of 1 Msymbol/s and that the frequency separation between the two frequencies representing a logical zero and a logical one is 500 kHz. The modulation index used for BLE is h=0.5, which means that the frequency deviation from the carrier is +−250 kHz. Since the subcarrier spacing for the 256 point IFFT is 78.125 kHz, it is not possible to exactly obtain +−250 kHz, but by selecting a deviation that is 3*78.125 kHz=234.375 kHz a rather good approximation is obtained. Thus a signal is generated that can be easily demodulated by a receiver compliant with BLE if the receiver treats the signal as repetition coded by a rate 1/16 code.

In this particular case, the effective data rate would be 62.5 kb/s, since the symbol rate is 1 Ms/s and the code rate is 1/16. To increase the data rate, one may use a smaller IFFT at the same sampling rate. If for instance a 128 points IFFT is used at a sampling rate of 20 MHz, the duration of the output of the IFFT is 6.4 µs, and then by adding a cyclic prefix of 1.6 µs we obtain a total duration of an OFDM symbol that equals 8 effectively resulting in a data rate of 125 kb/s.

In the discussion above we have discussed in terms of that the LRLP receiver, e.g. a "BLE-like" receiver, would be able to demodulate the signal. As discussed above, BLE is using GFSK whereas the signal generated by using an IFFT is "pure" FSK. This would not cause a problem for a typical BLE receiver. One should note that the Gaussian filter used to smooth the transition between symbols in GFSK mainly has an effect when two adjacent symbols are not the same, i.e., in the transition from a negative frequency deviation to a positive frequency deviation or vice versa. However, if, as in the example above, the same frequency deviation (sub-carrier) is used for 16 µs, it means that at most one out of 16 transitions as seen from the LRLP receiver actually means a transition from a negative frequency deviation to a positive frequency deviation or vice versa. In between these potential transitions, the experienced frequency deviation in a BLE-like receiver will be the same.

Figure 11:
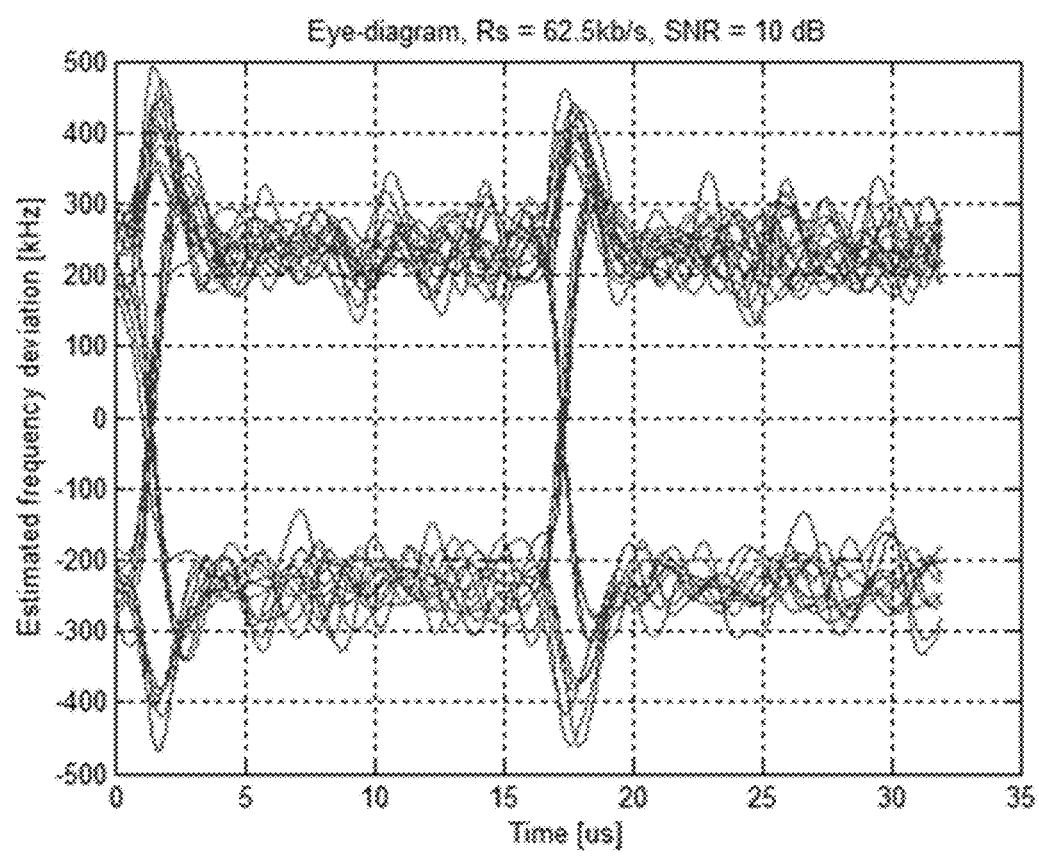
FIG. 11 illustrates an eye diagram when using a frequency discriminator type receiver according to some aspects of the disclosure.

FIG. 11 illustrates an eye diagram when using a frequency discriminator type receiver according to some aspects of the disclosure. In particular, FIG. 11 illustrates an eye diagram in the BLE receiver when the transmitted signal is as described above and the two possible frequencies are generated using the two subcarriers at +−234.375 kHz. A typical receiver would sample at the symbol rate, i.e., every µs, and then to make a decision combine the 16 samples properly. Preferably the sample values are transformed into log-likelihood ratios that then are added and the sum is used to make the decision.

Figure 12:
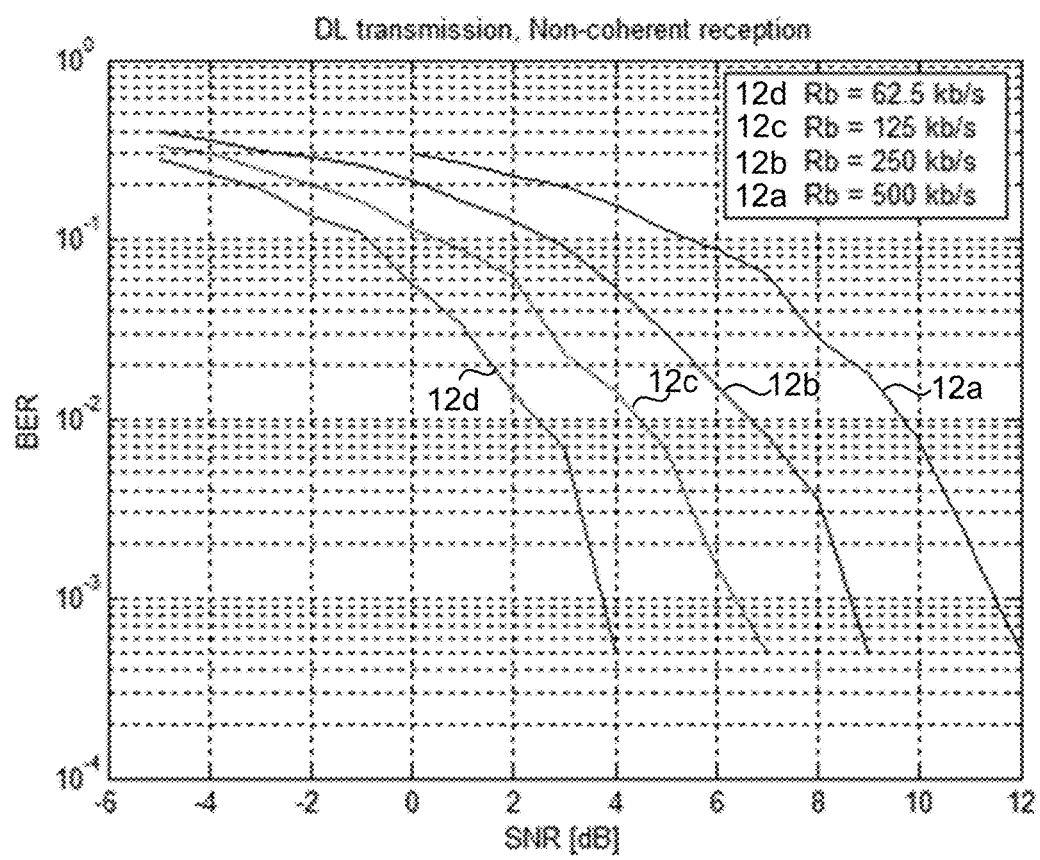
FIG. 12 illustrates simulated performance for non-coherent reception at different bit rates according to some aspects of the disclosure.

According to some aspects, the data rate is varied by varying the IFFT size. The data rate can be increased by using a smaller size IFFT. In FIG. 12 the performance is shown for four different data rates obtained using IFFT sizes of 32, 64,128, and 256, with corresponding CP durations of 0.4, 0.8, 1.6, and 3.2 µs represented by lines 12a, 12,b, 12c and 12d, respectively. In all cases the LRLP symbol rate is 1 Msymbol/s.

Some example implementations will now follow, where different modulation schemes for the low data rate LRLP subcarriers are used and some of the associated advantages will be highlighted.

Example Implementation Using Multi-Level Frequency-Shift Keying

According to some aspects, the information to the LRLP device is transmitted using M-level FSK, where M preferably is a power of two, i.e., M=4, 8, . . . , although in principle also other values of M is possible. That is, one out of M subcarriers is used for transmitting the information in each OFDM symbol. M-level FSK is a means to increase the data rate compared to the binary case, i.e., M=2.

Example Implementation Using Binary Phase-Shift Keying

Figure 13:
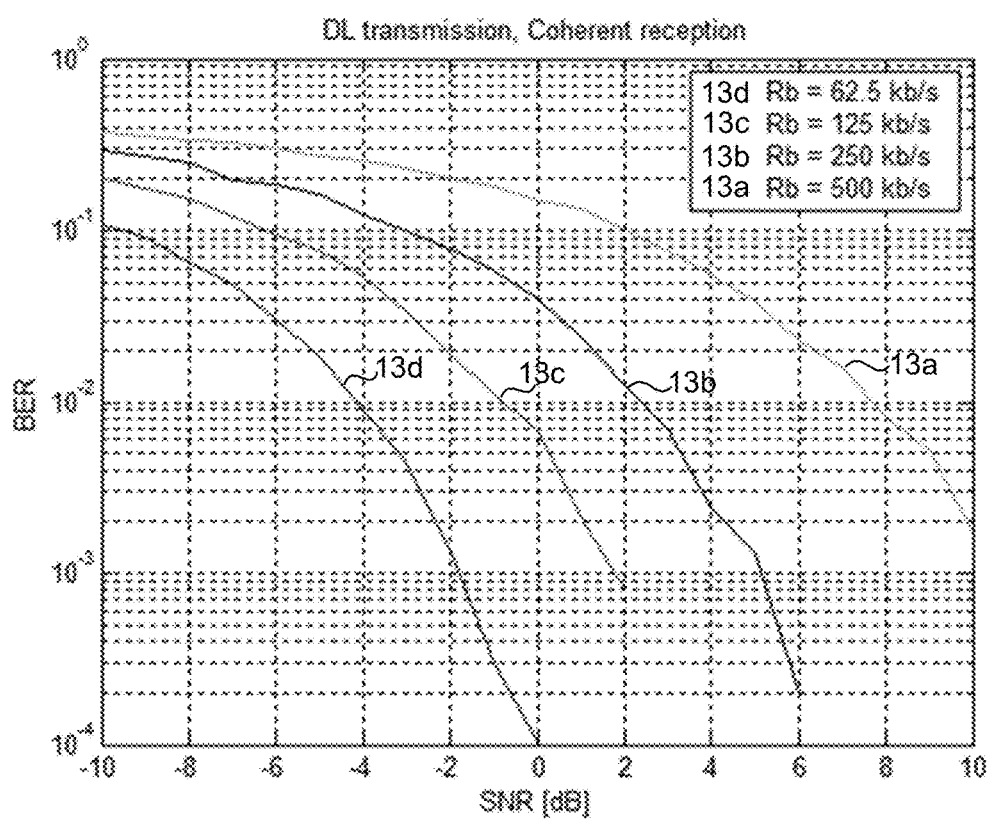
FIG. 13 illustrates simulated performance for coherent reception at different bit rates according to some aspects of the disclosure.

In one example, the information to the LRLP device is transmitted using Binary Phase-Shift Keying, BPSK. By selecting the phase of the subcarrier as a function of the information the LRLP binary data is transmitted using only one subcarrier. In this case, it is assumed that the receiver is performing the reception using a phase reference, i.e., coherent reception is assumed. The coherent reception has a positive impact on performance, particularly for a low signal-to-noise-ratio, SNR. This is evident from FIG. 13 below, illustrating simulated performance for coherent reception for some different bit rates. In all cases the LRLP symbol rate is 1 Msymbol/s.

Example Implementation USING Multi-Level Phase-Shift Keying

In one example, the information to the LRLP device is transmitted using M-level PSK. M preferably is a power of two, i.e., M=4, 8, . . . , although in principle also other values of M is possible. M-level PSK is a means to increase the data rate compared to the binary case, i.e., M=2.

Example Implementation Using Differential Binary Phase-Shift Keying

In one example, the information to the LRLP device is transmitted using Differential BPSK. Differential BPSK means that the information is not transmitted in the absolute phase, but instead in the phase change from the previous symbol. This allows for considerably simpler reception without the need for performing phase tracking.

Example Implementation Using Differential Multi-Level Phase-Shift Keying

In one example, the information to the LRLP device is transmitted using Differential Multi-level Phase-Shift Keying, DMPSK. M is preferably a power of two, i.e., M=4, 8, . . . , although in principle also other values of M is possible. DMPSK is a means to increase the data rate compared to the binary case, i.e., M=2.

Example Implementation Using Data Rate Dependent Modulation

As noted in the example using Binary Phase-Shift Keying above, to obtain really good performance at low data rate, coherent reception is advantageous. However, when the SNR is moderate or even large the gain by coherent reception is less. According to some aspects, the modulation used is therefore made data rate dependent. Specifically, when the data rate of information transmitted to the LRLP device is relatively high, a modulation which allows for low complex non-coherent reception is used, whereas when the transmitted data rate is relatively low, a modulation which assumed coherent reception is employed.

Example Implementation Using Binary FSK with a Pilot Tone

Figure 14:
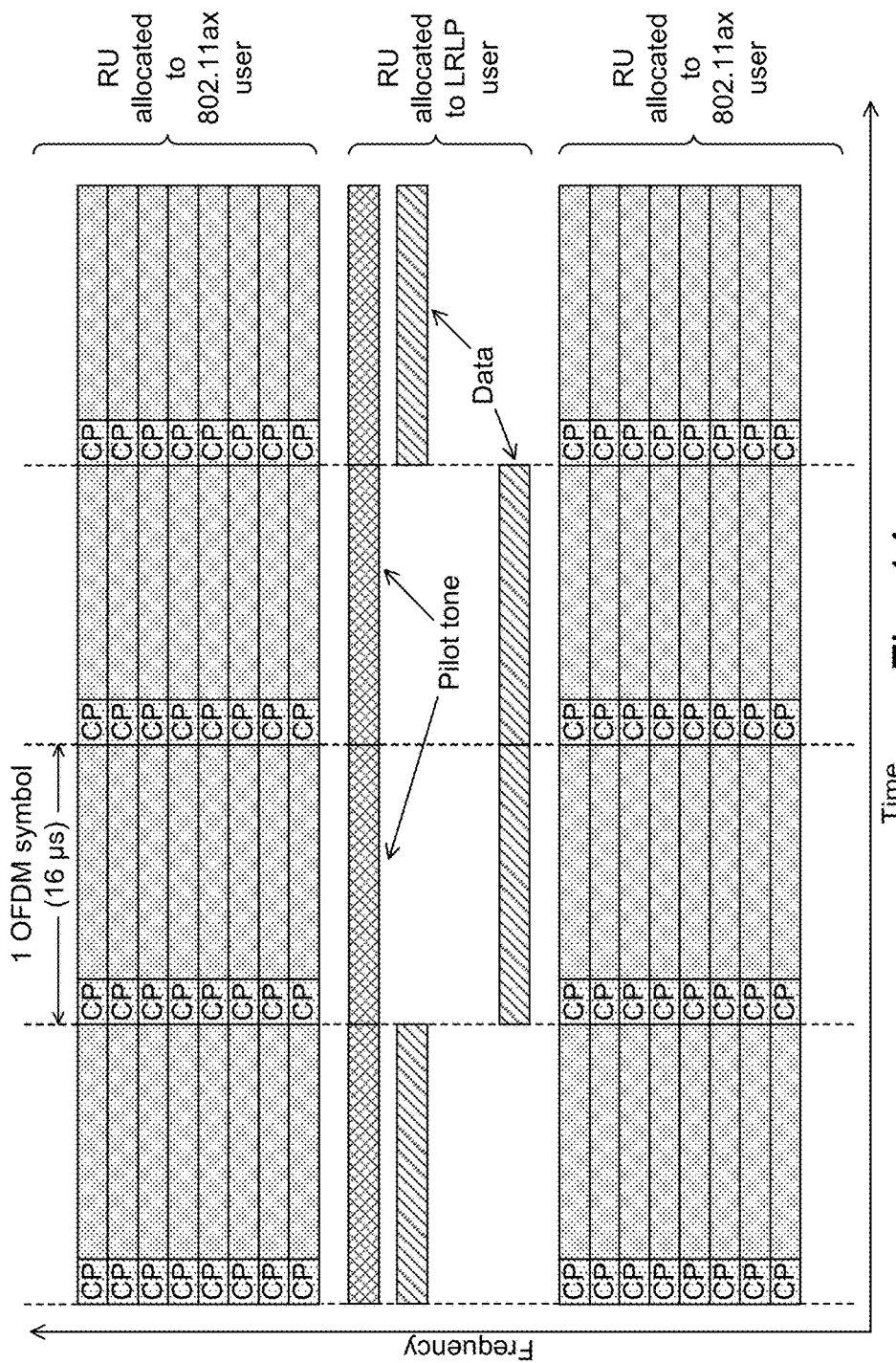
FIG. 14 illustrates resource unit allocation in the time-frequency plane with an added pilot tone according to some aspects of the disclosure.

Gaussian Frequency-Shift keying, GFSK, with integer modulation index (e.g. h=1) is beneficial for simple GFSK receivers because an integer modulation index induces spectral lines which are easily detectable. For example, a modulation index h=1 generates a data independent tone with a period equal to twice the symbol time. The non-OFDM receiver 813 can use this pure tone for frequency and phase locking. This may allow inexpensive hardware and better semi-coherent performance of a simple receiver, such as a frequency discriminator. These advantages of GFSK with integer modulation index can be obtained by modifying the embodiment using BFSK described above. Simply add one unmodulated subcarrier that is always on. This tone acts a pilot, and it is known at the non-OFDM receiver 813. This is illustrated in FIG. 14.

The disclosure also relates to methods for carrying out the steps associated with the disclosed units. The steps are typically performed in the units described above, but distributed implementations are also foreseeable. The units may be functional units, e.g. implemented, at least in part, as software. The functional units can be logically separate units or implemented within a logical framework, wherein logically separate means that the functional units can be individually addressed via signalling. Since the steps are typically performed in the units described above, the methods have all the advantages associated with the units described above.

Figure 15:
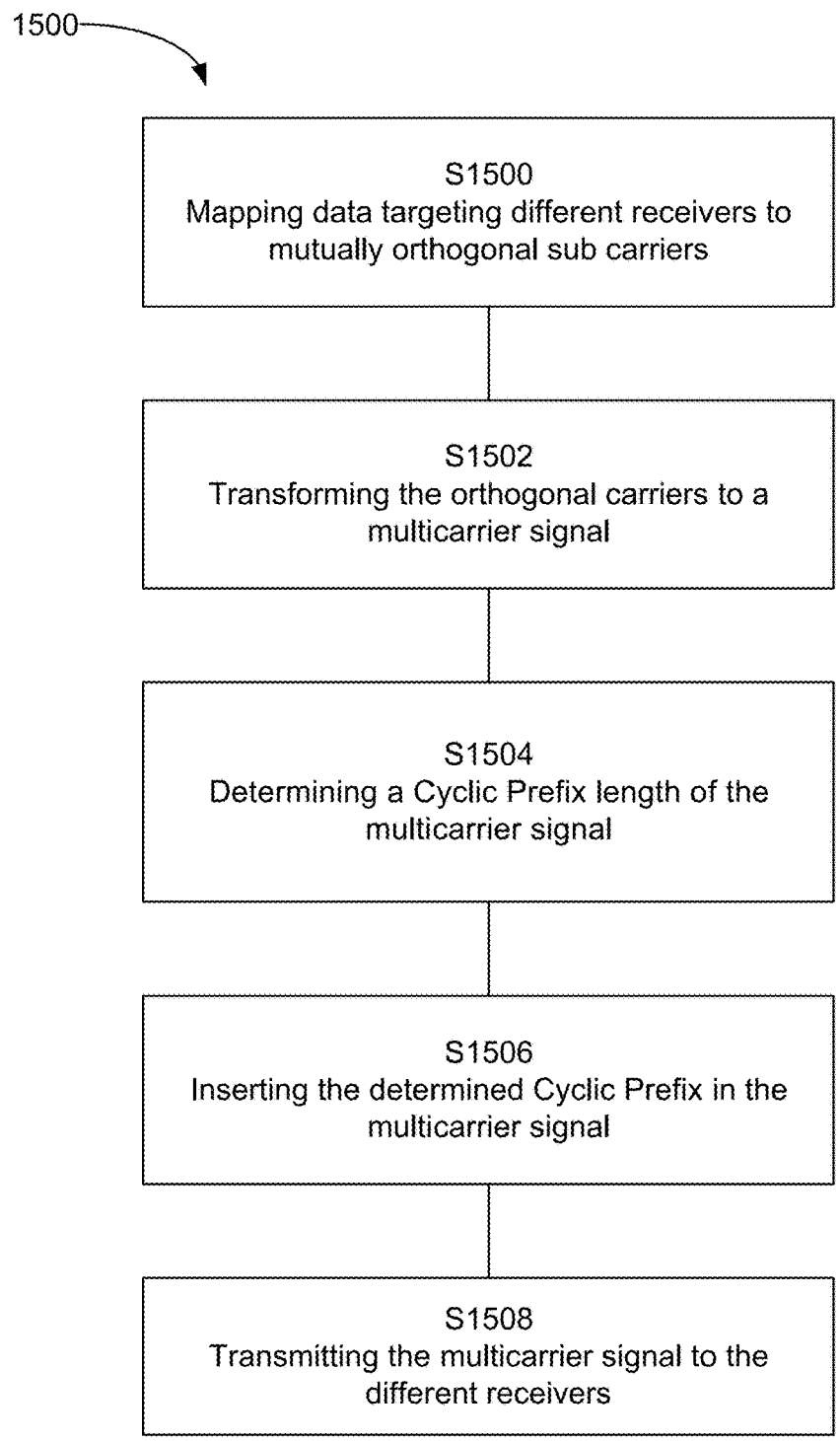
FIG. 15 is a flowchart that illustrates the method steps of transmitting a multicarrier signal to multiple different receivers according to the present disclosure.

FIG. 15 is a flowchart that illustrates the method steps of transmitting a multicarrier signal to multiple different receivers according to the present disclosure, wherein at least one of the receivers is an Orthogonal Frequency-Division Multiplexing, OFDM, receiver and wherein at least one of the receivers is a receiver using another modulation scheme. The method 1500 comprises mapping S1500 data targeting the different receivers to mutually orthogonal subcarrier signals, in accordance with the respective modulation schemes of the different receivers. The method 1500 further comprises transforming S1502 the orthogonal carriers to a multicarrier signal in the time domain. The method 1500 also comprises determining S1504 a Cyclic Prefix, CP, length of the multicarrier signal based on the symbol rate of the receiver using another modulation scheme. The method 1500 additionally comprises inserting S1506 the determined Cyclic Prefix in the multicarrier signal. The method 1500 yet further comprises transmitting S1508 the multicarrier signal to the multiple different receivers. The proposed method supports concurrent use of different types of wireless devices, one able to transmit and receive high data rates, the other only able to transmit and receive considerably lower data rates.

According to some aspects, the Cyclic Prefix is selected such that the duration of the output of the IFFT unit plus the duration of the Cyclic Prefix equals N times the symbol duration of the receiver using a modulation scheme other than OFDM, where N is an integer.

According to some aspects, the signals targeting receivers using a modulation scheme other than OFDM are separated in the frequency domain in accordance with predefined allocation rules.

The present disclosure also relates to a computer program comprising computer program code which, when executed, causes a multi-modulation transmitter to execute the disclosed method 1500 of transmitting a multicarrier signal to multiple different receivers.

Figure 16:
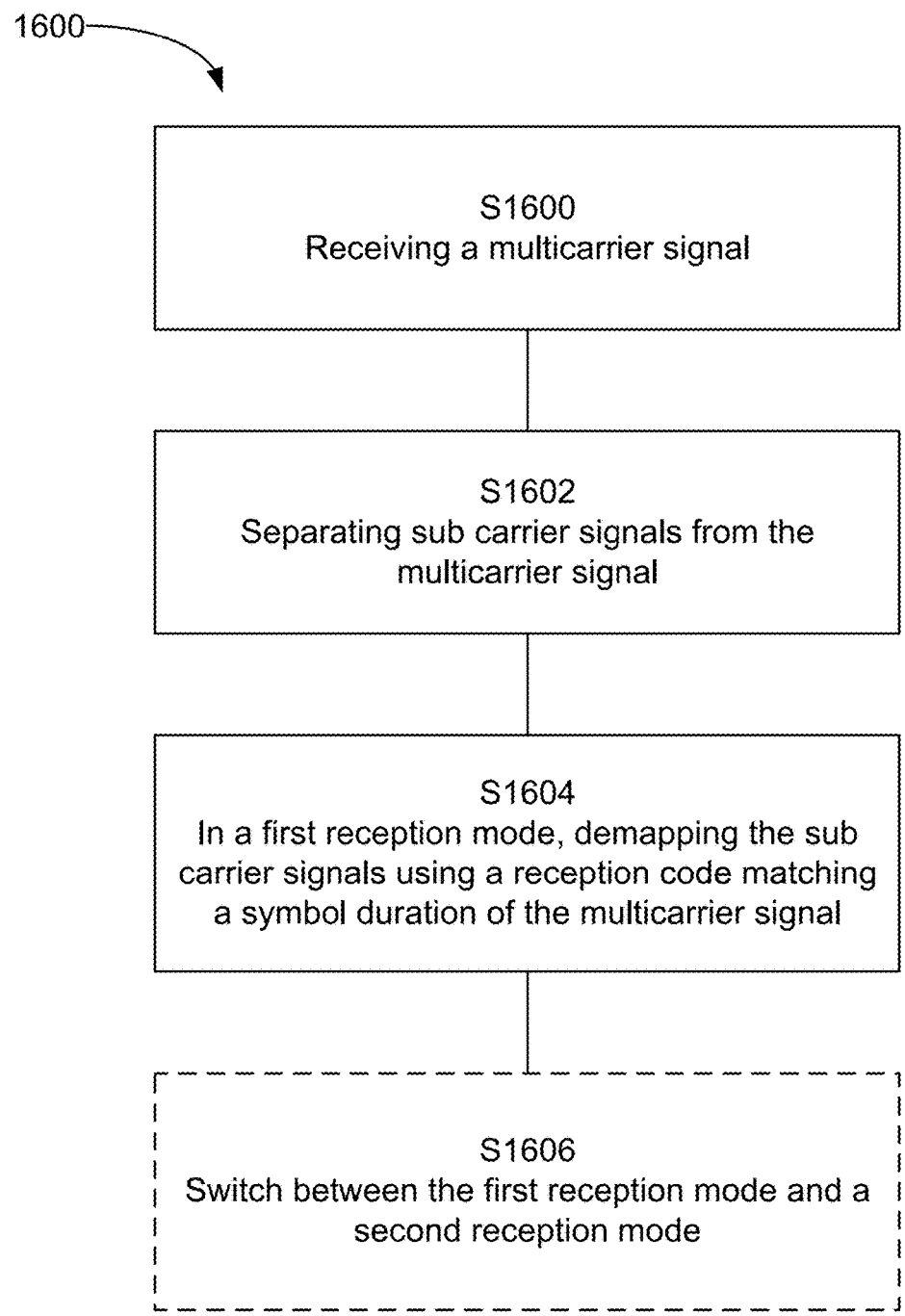
FIG. 16 is a flowchart that illustrates the method steps of receiving a multicarrier signal carrying data to multiple different receivers according to the present disclosure.

FIG. 16 is a flowchart that illustrates the method steps of receiving a multicarrier signal carrying data to multiple different receivers according to the present disclosure, wherein at least one of the receivers is an Orthogonal Frequency-Division Multiplexing, OFDM, receiver. The method 1600 comprises receiving S1600 the multicarrier signal. The method 1600 further comprises separating S1602 signals carrying data targeting the non-OFDM receiver from the multicarrier signal. The method 1600 also comprises, in a first reception mode, demapping S1604 the signals targeting the non-OFDM receiver using a repetition code matching a symbol duration of the multicarrier signal.

According to some aspects, the method comprises switching S1606 between the first and a second reception mode, wherein the second reception mode uses another repetition code.

According to some aspects, the repetition code is such that N times the symbol duration of symbols of the first reception mode of the non-OFDM receiver equals the duration of a payload plus the duration of a cyclic prefix, CP, of an OFDM symbol of the multicarrier signal, wherein N is an integer.

The present disclosure also relates to a computer program comprising computer program code which, when executed, causes a wireless device comprising a non-OFDM receiver to execute the disclosed method 1600 of receiving a multicarrier signal carrying data to multiple different receivers.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the function, acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Some of the various example embodiments described herein are described in the general context of functional units, method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that performs particular tasks or implement particular abstract data types, Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A multi-modulation transmitter configured to transmit a multicarrier signal to multiple different receivers, at least one of the receivers is a receiver using a modulation scheme other than Orthogonal Frequency-Division Multiplexing, OFDM, the multi-modulation transmitter comprising:
   a data mapping unit configured to map data targeting the different receivers to mutually orthogonal subcarrier signals, in accordance with the respective modulation schemes of the different receivers;
   an Inverse Fast Fourier Transform, IFFT, unit configured to transform the mutually orthogonal subcarrier signals to a multicarrier signal in the time domain;
   a cyclic prefix unit configured to:
      determine a Cyclic Prefix, CP, length of the multicarrier signal based on a symbol rate of the receiver using a modulation scheme other than OFDM; and
      insert the determined Cyclic Prefix in the multicarrier signal; and
   a radio unit configured to transmit the multicarrier signal to the multiple different receivers.

2. The multi-modulation transmitter according to claim 1, wherein at least one of the multiple different receivers is an OFDM receiver.

3. The multi-modulation transmitter according to claim 2, wherein the receiver using a modulation scheme other than OFDM has a lower data rate than the OFDM receiver.

4. The multi-modulation transmitter according to claim 2, wherein the OFDM receiver operates in accordance with one of IEEE 802.11 and 802.11ax.

5. The multi-modulation transmitter according to claim 1, wherein the cyclic prefix unit is configured to select the Cyclic Prefix such that the duration of the output of the IFFT unit plus the duration of the Cyclic Prefix equals N times the symbol duration of the receiver using a modulation scheme other than OFDM, where N is an integer.

6. The multi-modulation transmitter according to claim 1, wherein the data mapping unit is configured to map the data such that signals targeting receivers using a modulation scheme other than OFDM are separated in the frequency domain in accordance with predefined allocation rules.

7. The multi-modulation transmitter according to claim 1, wherein the at least one receiver using a modulation scheme other than OFDM is a single carrier receiver.

8. A network node in a wireless communication network comprising a multi-modulation transmitter, the multi-modulation transmitter being configured to transmit a multicarrier signal to multiple different receivers, at least one of the receivers is a receiver using a modulation scheme other than Orthogonal Frequency-Division Multiplexing, OFDM, the multi-modulation transmitter comprising:
   a data mapping unit configured to map data targeting the different receivers to mutually orthogonal subcarrier signals, in accordance with the respective modulation schemes of the different receivers;
   an Inverse Fast Fourier Transform, IFFT, unit configured to transform the mutually orthogonal subcarrier signals to a multicarrier signal in the time domain;
   a cyclic prefix unit configured to:
      determine a Cyclic Prefix, CP, length of the multicarrier signal based on a symbol rate of the receiver using a modulation scheme other than OFDM; and
      insert the determined Cyclic Prefix in the multicarrier signal; and
   a radio unit configured to transmit the multicarrier signal to the multiple different receivers.

9. A non-OFDM receiver using a modulation scheme other than Orthogonal Frequency-Division Multiplexing, OFDM, the non-OFDM receiver comprising:
   a radio unit configured to receive a multicarrier signal carrying data also targeting OFDM receivers;

a frequency separation unit configured to separate signals carrying data targeting the non-OFDM receiver from the multicarrier signal; and a demapping unit configured to, in a first reception mode, demap the signals targeting the non-OFDM receiver using a first repetition code matching a symbol duration of the multicarrier signal.

10. The non-OFDM receiver according to claim 9, wherein the demapping unit is configured to, in a second reception mode, use a second repetition code.

11. The non-OFDM receiver according to claim 10, wherein the demapping unit is configured to switch between the first and second reception modes.

12. The non-OFDM receiver according to claim 10, wherein the first and second reception modes use different modulation schemes.

13. The non-OFDM receiver according to claim 9, wherein the first repetition code is such that N times the symbol duration of symbols of the first reception mode of the non-OFDM receiver equals the duration of an OFDM symbol of the multicarrier signal, wherein N is an integer.

14. The non-OFDM receiver according to claim 9, wherein the non-OFDM receiver is included as part of a wireless device.

15. A method for transmitting a multicarrier signal to multiple different receivers, at least one of the receivers is an Orthogonal Frequency-Division Multiplexing, OFDM, receiver and at least one of the receivers is a receiver using another modulation scheme, the method comprising:

mapping data targeting the different receivers to mutually orthogonal subcarrier signals, in accordance with the respective modulation schemes of the different receivers;

transforming the orthogonal carriers to a multicarrier signal in the time domain;

determining a Cyclic Prefix, CP, length of the multicarrier signal based on the symbol rate of the receiver using another modulation scheme;

inserting the determined Cyclic Prefix in the multicarrier signal; and transmitting the multicarrier signal to the multiple different receivers.

16. The method according to claim 15, wherein the Cyclic Prefix is selected such that the duration of the output of the IFFT unit plus the duration of the Cyclic Prefix equals N times the symbol duration of the receiver using a modulation scheme other than OFDM, where N is an integer.

17. The method according to claim 15, wherein the signals targeting receivers using a modulation scheme other than OFDM are separated in the frequency domain in accordance with predefined allocation rules.

18. A non-transitory computer storage media storing computer program code which, when executed by a processor on a multi-modulation transmitter, causes the multi-modulation transmitter to perform a method for transmitting a multicarrier signal to multiple different receivers, at least one of the receivers is an Orthogonal Frequency-Division Multiplexing, OFDM, receiver and at least one of the receivers is a receiver using another modulation scheme, the method comprising:

mapping data targeting the different receivers to mutually orthogonal subcarrier signals, in accordance with the respective modulation schemes of the different receivers;

transforming the orthogonal carriers to a multicarrier signal in the time domain;

determining a Cyclic Prefix, CP, length of the multicarrier signal based on the symbol rate of the receiver using another modulation scheme;

inserting the determined Cyclic Prefix in the multicarrier signal; and transmitting the multicarrier signal to the multiple different receivers.

19. A method for receiving a multicarrier signal carrying data to multiple different receivers, at least one of the receivers is an Orthogonal Frequency-Division Multiplexing, OFDM, receiver, the method comprising:

receiving the multicarrier signal;

separating signals carrying data targeting the non-OFDM receiver from the multicarrier signal; and in a first reception mode, demapping the signals targeting the non-OFDM receiver using a first repetition code matching a symbol duration of the multicarrier signal.

20. The method according to claim 19, the method further comprising:

switching between the first and a second reception mode, wherein the second reception mode uses a second repetition code.

21. The method according to claim 19, wherein the first repetition code is such that N times the symbol duration of symbols of the first reception mode of the non-OFDM receiver equals the duration of an OFDM symbol of the multicarrier signal, wherein N is an integer.

22. A non-transitory computer storage media storing computer program code which, when executed by a processor on a wireless device, the wireless device comprising a non-OFDM receiver using a modulation scheme other than Orthogonal Frequency-Division Multiplexing, OFDM, causes the wireless device to perform a method, the method comprising:

receiving a multicarrier signal;

separating signals carrying data targeting the non-OFDM receiver from the multicarrier signal; and in a first reception mode, demapping the signals targeting the non-OFDM receiver using a first repetition code matching a symbol duration of the multicarrier signal.

* * * * *